US012173677B2

(12) United States Patent
Noami et al.

(10) Patent No.: US 12,173,677 B2
(45) Date of Patent: Dec. 24, 2024

(54) INTERNAL COMBUSTION ENGINE

(71) Applicant: KAWASAKI MOTORS, LTD., Akashi (JP)

(72) Inventors: Takuya Noami, Akashi (JP); Tetsuji Yamamoto, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 18/390,440

(22) Filed: Dec. 20, 2023

(65) Prior Publication Data

US 2024/0209824 A1 Jun. 27, 2024

(30) Foreign Application Priority Data

Dec. 21, 2022 (JP) ................................ 2022-204631

(51) Int. Cl.
*F02N 19/00* (2010.01)

(52) U.S. Cl.
CPC ................................ *F02N 19/004* (2013.01)

(58) Field of Classification Search
CPC ............................ F02N 19/004; F02N 19/003
See application file for complete search history.

(56) References Cited

U.S. PATENT DOCUMENTS

2016/0160712 A1* 6/2016 Hongo .................... F01L 13/08
123/182.1

FOREIGN PATENT DOCUMENTS

EP 3203056 A1 8/2017
JP 2007-255272 A 10/2007

* cited by examiner

*Primary Examiner* — Jacob M Amick
*Assistant Examiner* — Charles J Brauch
(74) *Attorney, Agent, or Firm* — PROCOPIO, CORY, HARGREAVES & SAVITCH LLP

(57) ABSTRACT

There is provided an internal combustion engine including: a crankshaft; a first cylinder and a second cylinder; and a decompression device configured to depressurize the first cylinder and the second cylinder at a time when the internal combustion engine starts to rotationally derive relative to the first cylinder and the second cylinder at a time after the internal combustion engine starts to rotationally drive. The decompression device is configured such that, at the time when the internal combustion engine starts to rotationally derive, a decompression amount in the second cylinder is greater than a decompression amount in the first cylinder.

12 Claims, 11 Drawing Sheets

INTERNAL COMBUSTION ENGINE

CROSS-REFERENCE TO RELATED APPLICATIONS

This application is based on and claims priority under 35 USC 119 from Japanese Patent Application No. 2022-204631 filed on Dec. 21, 2022, the contents of which are incorporated herein by reference.

TECHNICAL FIELD

The present disclosure relates to an internal combustion engine including a decompression device.

BACKGROUND ART

JP2007-255272A discloses a decompression device that reduces the torque required to crank and start an internal combustion engine.

When starting an internal combustion engine, for example, a starting motor is used. In this case, if the torque of the starting motor is not sufficient, starting performance of the internal combustion engine decreases. In addition, depending on design conditions and usage conditions of the internal combustion engine, it may be required to further shorten a starting time to start the internal combustion engine.

SUMMARY OF INVENTION

The present disclosure provides an internal combustion engine which can improve the starting performance thereof.

According to an illustrative aspect of the present disclosure, an internal combustion engine includes: a crankshaft; a first cylinder and a second cylinder: and a decompression device configured to depressurize the first cylinder and the second cylinder at a time when the internal combustion engine starts to rotationally derive relative to the first cylinder and the second cylinder at a time after the internal combustion engine starts to rotationally drive. The decompression device is configured such that, at the time when the internal combustion engine starts to rotationally derive, a decompression amount in the second cylinder is greater than a decompression amount in the first cylinder.

According to an aspect of the present disclosure, the starting performance of the internal combustion engine can be improved.

DESCRIPTION OF EMBODIMENTS

Hereinafter, embodiments will be described with reference to the drawings. Directions described below are based on directions seen from an occupant of a vehicle. A decompression operation described below refers to depressurizing a cylinder of an internal combustion engine at a time when the internal combustion engine starts to rotationally drive as compared with a time after the internal combustion engine starts to rotationally drive, and thereby reducing compression resistance of the internal combustion engine at the time when the internal combustion engine starts to rotationally drive. The sentence that the internal combustion engine starts to rotationally drive (i.e., rotation start of the internal combustion engine) refers to starting to rotate a crankshaft of the internal combustion engine by an external force applied to the internal combustion engine. In other words, a rotation start state refers to, for example, a state until rotational driving of the crankshaft is started by an explosion of fuel in the cylinder of the internal combustion engine. The external force includes, for example, a rotational drive force applied from an electric motor of a drive source for traveling, and an external force applied by a person such as an occupant.

First Embodiment

Figure 1:
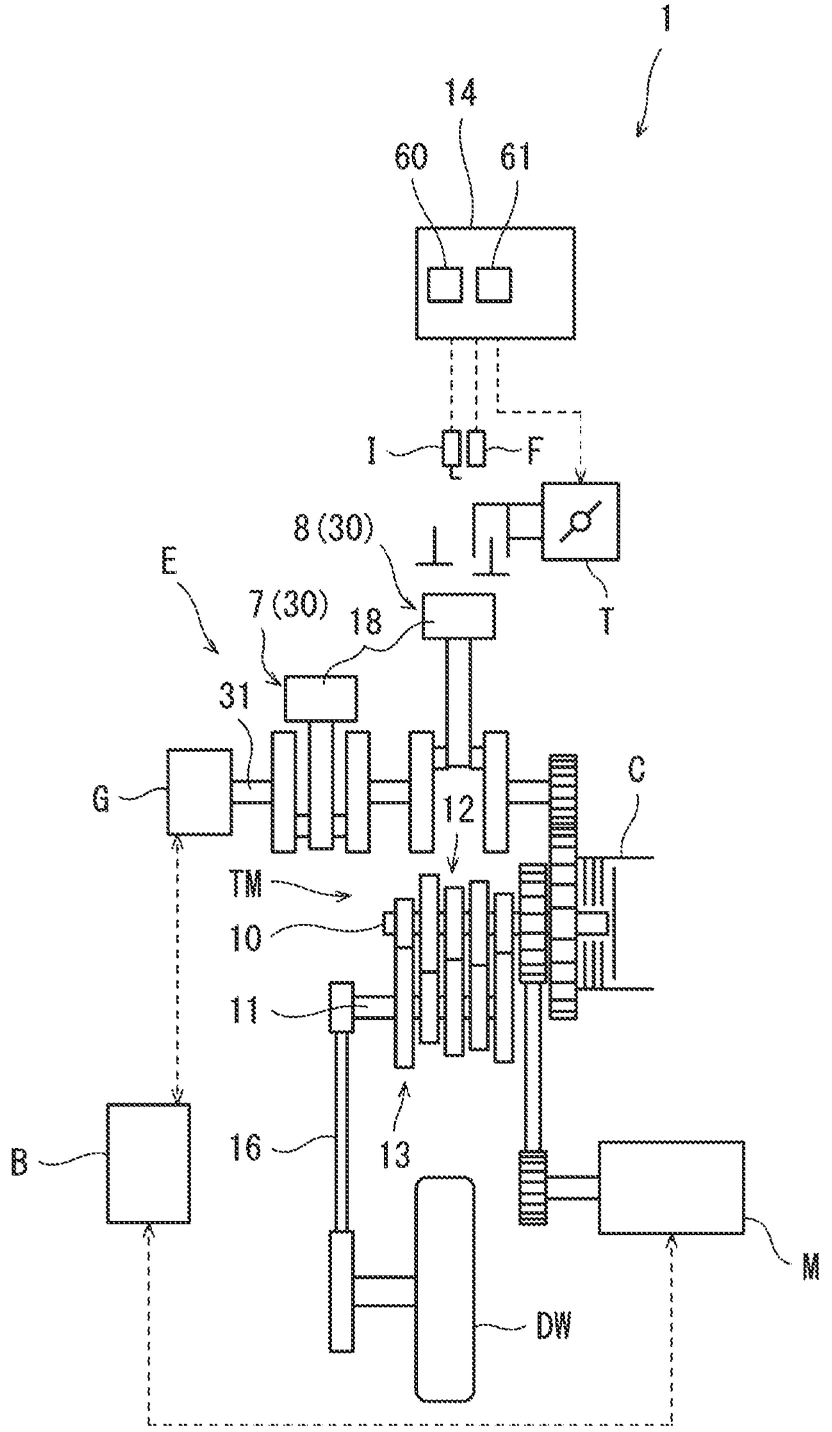
FIG. 1 is a schematic diagram of a vehicle according to an embodiment.

FIG. 1 is a schematic diagram of a vehicle 1 according to a first embodiment. As shown in FIG. 1, the vehicle 1 of the present embodiment includes, for example, a plurality of drive sources E and M for traveling and a drive wheel DW to which drive forces of the drive sources E and M are transmitted. The plurality of drive sources E and M for traveling include a first drive source for traveling and a second drive source for traveling different from the first drive source. The first drive source of the present embodiment is an internal combustion engine E. The second drive source of the present embodiment is an electric motor M. For example, the vehicle 1 is a hybrid vehicle. The vehicle 1 is switchable between a first traveling mode in which only the electric motor M is used as the drive source for traveling and a second traveling mode in which at least the internal combustion engine E is used as the drive source for traveling. The vehicle 1 of the present embodiment is configured such that the internal combustion engine E can be started while the vehicle 1 is traveling by the electric motor M. As a result, the vehicle 1 can switch the traveling mode from the first traveling mode to the second traveling mode while traveling in the first traveling mode. For example, the vehicle 1 is a straddle-type vehicle on which an occupant rides, and is a motorcycle.

The vehicle 1 includes a generator G and a storage battery B. The generator G generates electric power using the drive force of the internal combustion engine E. The generator G of the present embodiment is, for example, an integrated starter generator (ISG), and also functions as a starter motor that rotates a crankshaft 31 at the time of the rotation start of the internal combustion engine E. The storage battery B is connected to the generator G and the electric motor M and drives the generator G and the electric motor M that function as starter motors. The storage battery B stores electric power using the output of the generator G. The drive wheel DW is driven by the output of the electric motor M in the first traveling mode, and is driven by at least the output of the internal combustion engine E in the second traveling mode. The vehicle 1 is not limited to a motorcycle, and may be, for example, a three-wheeled vehicle or a four-wheeled vehicle. The vehicle 1 may include only the internal combustion engine E as the drive source for traveling.

For example, the internal combustion engine E of the present embodiment includes a plurality of pistons 18, a plurality of cylinders 30 disposed corresponding to the respective pistons 18, and the crankshaft 31 that is rotationally driven by an explosion in a combustion chamber 30*a* (see FIG. 2) in the cylinder 30. The plurality of cylinders 30 of the present embodiment include a first cylinder 7 and a second cylinder 8. The internal combustion engine E of the present embodiment is, for example, a four-stroke engine. Therefore, during one cycle of an operation period of the internal combustion engine E, the crankshaft 31 rotates twice about an axis thereof. The piston 18 reciprocates between a bottom dead center and a top dead center in the cylinder 30 during the one cycle. In a compression stroke in which the piston 18 moves from the bottom dead center to the top dead center, a pressure in the cylinder 30 increases as a gas in the cylinder 30 is compressed.

As will be described in detail later, the internal combustion engine E includes a decompression device 9 (see FIG. 2) that depressurizes the first cylinder 7 and the second cylinder 8 at the time when the internal combustion engine E starts to rotationally drive as compared with the time after the internal combustion engine E starts to rotationally drive. In the vehicle 1, the decompression operation is implemented using the decompression device 9. Hereinafter, when a maximum pressure in the cylinder 30 compressed in the compression stroke of the internal combustion engine E without performing the decompression operation is defined as a base pressure, the amount by which the maximum pressure in the cylinder 30 compressed in the compression stroke of the internal combustion engine E becomes smaller than the base pressure due to the decompression operation is expressed as a decompression amount. That is, the larger the decompression amount, the smaller the pressure in the cylinder compressed in the compression stroke.

According to the present embodiment, at the time when the internal combustion engine E starts to rotationally drive, the decompression device 9 increases the decompression amount in the second cylinder 8 as compared with the decompression amount in the first cylinder 7. As a result, at the time when the internal combustion engine E starts to rotationally drive, a total pressure in the cylinder 30 compressed in the compression stroke becomes smaller than that of a case where only a single cylinder is depressurized or the second cylinder 8 is depressurized by the same decompression amount as that in the first cylinder 7. In other words, at the time when the internal combustion engine E starts to rotationally drive, the total compression resistance upon compressing the gas in the cylinder 30 during the compression stroke is reduced. As a result, the external force required for the rotation start of the crankshaft 31 can be reduced, so that the internal combustion engine E can be easily started. In a case where the plurality of cylinders 30 include three or more cylinders, for example, it is preferable that the plurality of cylinders 30 include a single first cylinder 7 and a plurality of second cylinders 8. In this case, the plurality of cylinders 30 include more cylinders with a large decompression amount than cylinders with a small decompression amount.

The vehicle 1 also includes a control device 14 that controls a combustion state in the second cylinder 8. The control device 14 controls, for example, at least one of an ignition device I that is provided in the internal combustion engine E, and ignites a fuel in the cylinder 30, a fuel injector F that is provided in the internal combustion engine E and injects a fuel into the cylinder 30, and an electronically controlled throttle T that is provided in the internal combustion engine E and adjusts the amount of intake air into the cylinder 30. The control device 14 includes a combustion control circuit that controls a combustion state in the cylinder 30. The control device 14 of the present embodiment includes a memory 60 in which a program is stored, and a processor 61 that executes the program stored in the memory 60. For example, the combustion control circuit is implemented by the memory 60 and the processor 61. For example, the control device 14 includes an electronic control unit (ECU).

The vehicle 1 also includes a transmission TM that changes an output rotation speed of the drive sources E and M for traveling, and a clutch C that connects and disconnects a power transmission path disposed between the internal combustion engine E and the transmission TM. The transmission TM includes an input shaft 10 to which a drive force is transmitted from the outside, and an output shaft 11 that outputs the drive force to the outside. The transmission TM also includes gear trains 12 and 13 disposed on the input shaft 10 and the output shaft 11. The output of the transmission TM is transmitted from the output shaft 11 to the drive wheel DW via a transmission body 16 provided in the vehicle 1. The transmission body 16 includes, for example, a chain, a belt, or a drive shaft, but the configuration of the transmission body 16 is not limited thereto. The generator G is accommodated in an internal space disposed on one side in a vehicle width direction of a crankcase 20 (see FIG. 2) of the internal combustion engine E. The generator G of the present embodiment has a function of starting the internal combustion engine E, but the configuration of the generator G is not limited thereto. For example, the vehicle 1 may include, in addition to the generator G, a starter motor that starts and rotates the crankshaft 31.

Figure 2:
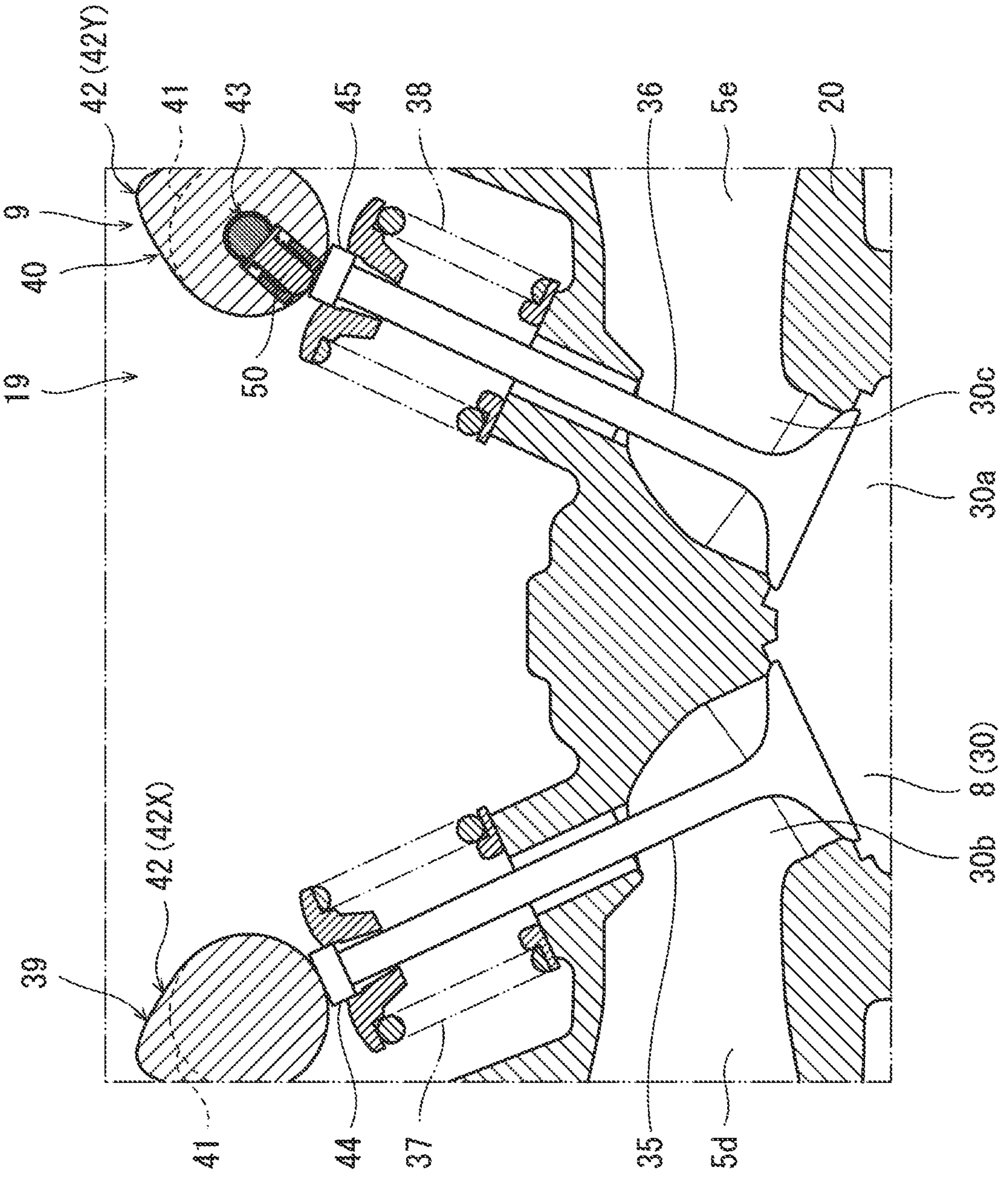
FIG. 2 is a partial cross-sectional view of an internal combustion engine in FIG. 1 when viewed from an axial direction of a camshaft.

FIG. 2 is a partial cross-sectional view of the internal combustion engine E in FIG. 1 when viewed from an axial direction of camshafts 39 and 40. FIG. 2 shows a part of the combustion chamber 30*a*, which is an internal space of the second cylinder 8, and a cross-section in a radial direction of the camshafts 39 and 40. As shown in FIG. 2, the internal combustion engine E includes a plurality of intake ports 30*b* and a plurality of exhaust ports 30*c*. The intake port 30*b* communicates with an intake path 5*d* that is provided in the internal combustion engine E and allows intake air supplied from the outside to flow into the cylinder 30. The exhaust port 30*c* communicates with an exhaust path 5*e* that is provided in the internal combustion engine E and through which exhaust gas discharged from the cylinder 30 flows toward the outside of the internal combustion engine E. The ports 30*b* and 30*c* allow an internal space of the cylinder 30 to communicate with the outside. For example, in the internal combustion engine E, two intake ports 30*b* and two exhaust ports 30*c* are disposed for each cylinder 30. The number of the ports 30*b* and 30*c* disposed for each cylinder 30 is not limited thereto.

The internal combustion engine E includes a plurality of valves that open the combustion chamber 30*a* of the cylinder 30 to the outside and shut off the same from the outside. The plurality of valves include a plurality of intake valves 35 and a plurality of exhaust valves 36. The plurality of intake valves 35 are disposed corresponding to the plurality of intake ports 30*b*, respectively. For example, in the internal combustion engine E, two intake valves 35 and two exhaust valves 36 are disposed for each cylinder 30. The configuration and arrangement of the valves are not limited thereto.

The internal combustion engine E includes a valve biasing body 37 that biases the intake valve 35 in a direction to close the intake port 30*b*. The intake port 30*b* is closed by the intake valve 35 pressed against an opening periphery of the intake port 30*b* by a biasing force of the valve biasing body 37. The plurality of exhaust valves 36 are disposed corresponding to the plurality of exhaust ports 30*c*. The internal combustion engine E includes a valve biasing body 38 that biases the exhaust valve 36 in a direction to close the exhaust port 30*c*. The exhaust port 30*c* is closed by the exhaust valve 36 pressed against an opening periphery of the exhaust port 30*c* by a biasing force of the valve biasing body 38. The biasing bodies 37 and 38 include springs, for example. The configuration of the biasing bodies 37 and 38 is not limited thereto. Here, one valve does not simultaneously open the combustion chambers 30*a* of two or more cylinders 30 to the outside or shut off the same from the outside.

The internal combustion engine E also includes the first camshaft 39 and the second camshaft 40 which are rotated by a rotational drive force of the crankshaft 31. The camshafts 39 and 40 each include a rotatably supported shaft body 41, and a plurality of cams 42 attached to the shaft body 41. The plurality of cams 42 are rotated about a predetermined axis to apply a drive force to the plurality of valves. According to the present embodiment, the plurality of cams 42 rotate about an axis of the shaft body 41 together with the shaft body 41. For example, the plurality of cams 42 include intake cams 42X and exhaust cams 42Y. The intake cam 42X is attached to the first camshaft 39 and is disposed corresponding to the intake valve 35. The exhaust cam 42Y is attached to the second camshaft 40 and is disposed corresponding to the exhaust valve 36. The plurality of cams 42 are disposed such that cam ridges 42*a* (see FIG. 4) are positioned at predetermined positions in a peripheral direction of the shaft body 41 according to the opening timing of corresponding valves among the plurality of valves.

The second camshaft 40 is, for example, a cylindrical body. A decompression shaft 43 that applies an external force to a plurality of decompression bodies 50, which will be described later, is inserted into the second camshaft 40. For example, the second camshaft 40 and the decompression shaft 43 are disposed on the same axis and are individually rotatably supported about the axis.

For example, the internal combustion engine E includes valve lifters 44 and 45 attached to the valves 35 and 36, respectively. The valve lifters 44 and 45 are disposed so as to be able to come into contact with the cam 42. The valve lifter 45 is disposed so as to be able to come into contact with the decompression body 50. The valve lifters 44 and 45 transmit to the valves 35 and 36 the external force applied to the cam 42 and the decompression body 50. The valve lifter is also referred to as a tappet.

As the first camshaft 39 rotates, the cam ridge 42*a* of the intake cam 42X presses the valve lifter 44, thereby transmitting an external force from the intake cam 42X to the intake valve 35 and the biasing body 37. Due to this external force, the intake valve 35 is pushed down toward the inside of the cylinder 30 against the elastic force of the biasing body 37. As a result, the intake port 30*b* is opened. When the cam ridge 42*a* of the intake cam 42X moves away from the valve lifter 44 in response to rotation of the first camshaft 39, the external force transmitted to the intake valve 35 and the biasing body 37 disappears. As a result, the intake valve 35 is moved by the biasing force of the biasing body 37, and the intake port 30*b* is again closed by the intake valve 35.

As the second camshaft 40 rotates, the cam ridge 42*a* of the exhaust cam 42Y presses the valve lifter 45, thereby transmitting an external force from the exhaust cam 42Y to the exhaust valve 36 and the biasing body 38. Due to this external force, the exhaust valve 36 is pushed down toward the inside of the cylinder 30 against the elastic force of the biasing body 38. As a result, the exhaust port 30*c* is opened. When the cam ridge 42*a* of the exhaust cam 42Y moves away from the valve lifter 45 in response to rotation of the second camshaft 40, the external force transmitted to the exhaust valve 36 and the biasing body 38 disappears. As a result, the exhaust valve 36 is moved by the biasing force of the biasing body 38, and the exhaust port 30*c* is again closed by the exhaust valve 36.

As described above, the internal combustion engine E includes, for example, a valve operating device 19 including the camshafts 39 and 40, the cams 42, and the biasing bodies 37 and 38. The valve operating device 19 operates the plurality of valves in at least one of an intake stroke and an exhaust stroke of the internal combustion engine E. The configuration of the valve operating device 19 is not limited thereto. For example, the valve operating device 19 may have a configuration in which the cam 42 applies an external force to the valves 35 and 36 via a rocker arm.

The decompression device 9 depressurizes the first cylinder 7 and the second cylinder 8 at the time when the internal combustion engine E starts to rotationally drive as compared with the time after the internal combustion engine E starts to rotationally drive. The decompression device 9 of the present embodiment includes the plurality of decompression bodies 50 and a plurality of shifters 51. The decompression bodies 50 are disposed so as to protrude outward from outer peripheral surfaces of the plurality of cams 42. For example, the decompression device 9 of the present embodiment drives the exhaust valve 36 so as to reduce the compression resistance of the cylinder 30 by opening the combustion chamber 30*a* of the cylinder 30 to the outside. Therefore, the decompression body 50 is disposed on the exhaust cam 42Y so as to protrude toward the exhaust valve 36.

The decompression bodies 50 are disposed for the first cylinder 7 and the second cylinder 8, respectively. For example, the plurality of decompression bodies 50 have the same structure. The internal combustion engine E of the present embodiment includes, for example, a single camshaft to which all the decompression bodies 50 and all the plurality of cams 42 corresponding to all the decompression bodies 50 are attached. The single camshaft of the present embodiment is the second camshaft 40. The second camshaft 40 rotates the plurality of cams 42, which are the exhaust cams 42Y, about the axis of the shaft body 41. The shifters 51 shift the plurality of decompression bodies 50 between a reference position P1 and a protruding position P2 (see FIG. 7), which will be described later, in accordance with a rotation speed of the crankshaft 31. The decompression device 9 of the present embodiment includes the plurality of shifters 51 disposed corresponding to the plurality of decompression bodies 50, respectively.

Figure 3:
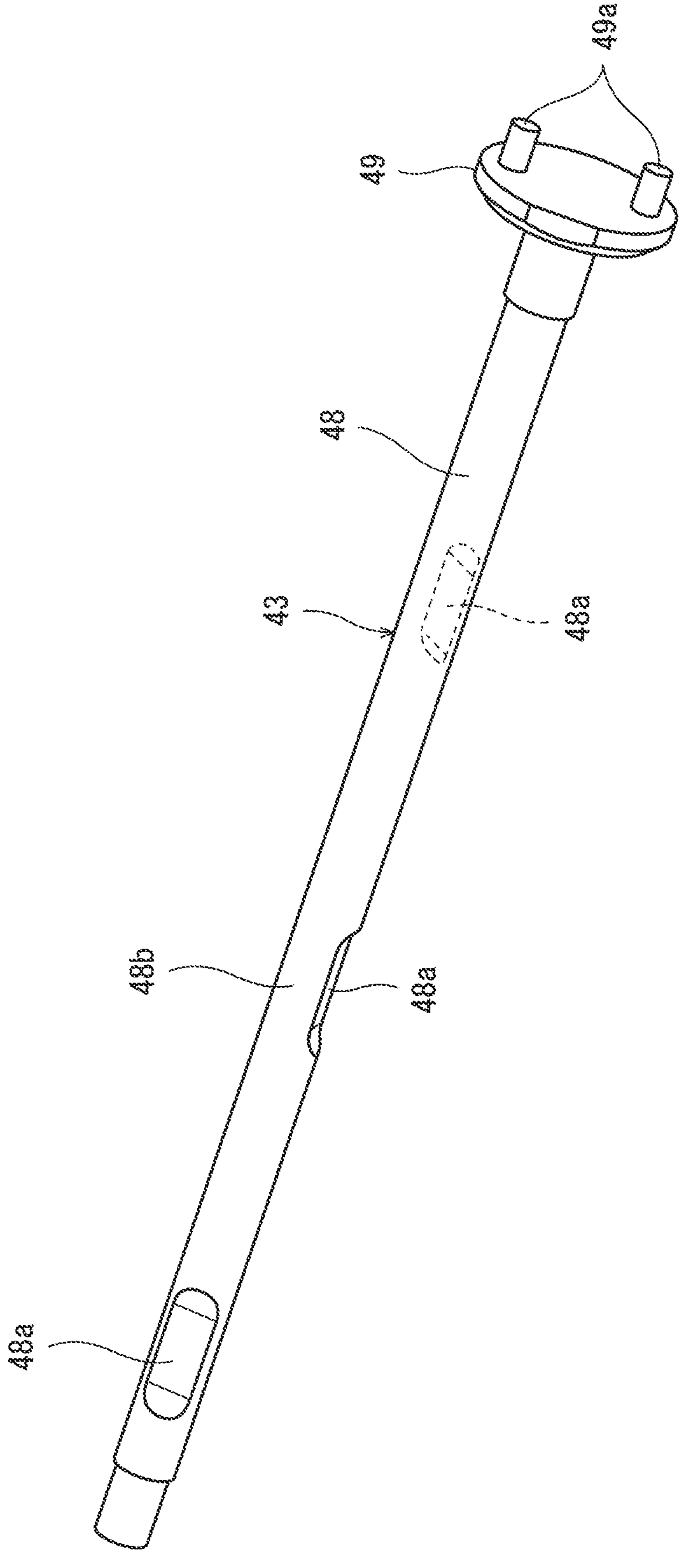
FIG. 3 is an external view of a decompression shaft in FIG. 2.

FIG. 3 is an external view of the decompression shaft 43 in FIG. 2. The decompression shaft 43 is rotatably supported about an axis of the second camshaft 40 independently of the second camshaft 40 and applies, to the plurality of decompression bodies 50, an external force for shifting the decompression bodies 50. As shown in FIG. 3, the decompression shaft 43 includes a shaft body 48 and a control plate 49 disposed at one end of the shaft body 48 in an axial direction. The shaft body 48 has a plurality of recesses 48*a* disposed on a circumferential surface thereof. The plurality of recesses 48*a* are disposed corresponding to the plurality of decompression bodies 50, respectively. The plurality of recesses 48*a* are disposed at different positions in a peripheral direction of the shaft body 48. The control plate 49 controls relative positions of the second camshaft 40 and the decompression shaft 43 about the axis by an external force applied from a weight 54 (see FIG. 4). The control plate 49 has at least one protrusion 49*a* protruding outward from a plate surface in the axial direction of the shaft body 48.

Figure 4:
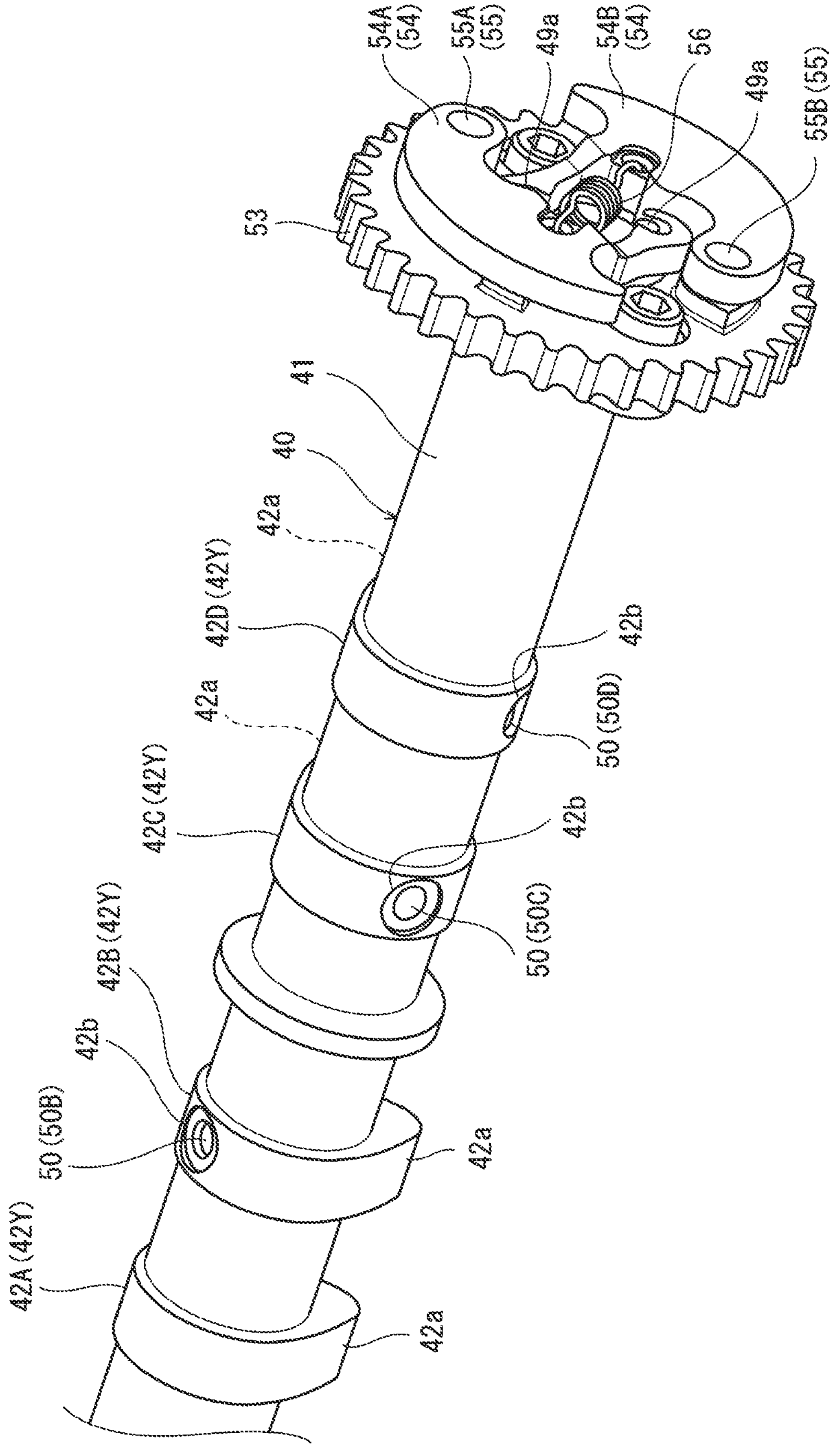
FIG. 4 is an external view of the camshaft in FIG. 2.

FIG. 4 is an external view of the second camshaft 40 in FIG. 2. As shown in FIG. 4, the second camshaft 40 includes a sprocket gear 53 disposed at one end of the shaft body 41 in an axial direction and at least one weight 54 disposed to overlap the sprocket gear 53. The sprocket gear 53 is fixed to the shaft body 41. The rotational drive force of the crankshaft 31 is transmitted to the sprocket gear 53 by a transmission body 17 (see FIG. 6) provided in the internal combustion engine E. The transmission body 17 includes, for example, a chain, a belt, or a drive shaft, but the configuration of the transmission body 17 is not limited thereto. The sprocket gear 53 is a spur gear. The sprocket gear 53 includes at least one shaft body 55 protruding outward from the plate surface in the axial direction of the shaft body 41. The second camshaft 40 includes the same number of weights 54 and shaft bodies 55.

The weight 54 is rotatably supported by the shaft body 55 within a certain angular range about an axis of the shaft body 55. In the present embodiment, the at least one weight 54 includes a pair of weights 54A and 54B. The at least one shaft body 55 includes a shaft body 55A that supports the weight 54A, and a shaft body 55B that supports the weight 54B. The decompression device 9) includes a weight biasing body 56 that biases the pair of weights 54A and 54B in a direction of coming closer to each other. The pair of weights 54A and 54B are connected to the biasing body 56. The biasing body 56 includes a spring, for example. The configuration of the biasing body 56 is not limited thereto.

The plurality of exhaust cams 42Y are disposed apart from each other in the axial direction of the second camshaft 40. Positions of the cam ridges 42*a* in a peripheral direction of the second camshaft 40 are adjusted such that the plurality of exhaust cams 42Y apply an external force to the exhaust valves 36 at a predetermined timing. The plurality of exhaust cams 42Y include at least two or more cams disposed corresponding to the first cylinder 7 and two or more cams disposed corresponding to the second cylinder 8.

The plurality of exhaust cams 42Y of the present embodiment include a total of four cams 42. For example, the plurality of exhaust cams 42Y include a first cam 42A and a second cam 42B which are a pair of cams disposed corresponding to the first cylinder 7. The plurality of exhaust cams 42Y include a third cam 42C and a fourth cam 42D which are a pair of cams disposed corresponding to the second cylinder 8. For example, positions of top portions of the cam ridges 42*a* of the pair of cams 42A and 42B in the peripheral direction of the camshaft 40 are aligned. Positions of top portions of the cam ridges 42*a* of the pair of cams 42C and 42D in the peripheral direction of the camshaft 40 are aligned. In the peripheral direction of the camshaft 40, the positions of the top portions of the cam ridges 42*a* of the pair of cams 42A and 42B are different from the positions of the top portions of the cam ridges 42*a* of the pair of cams 42C and 42D. As a result, in the internal combustion engine E, the timings at which the exhaust valves 36 are opened and closed between the first cylinder 7 and the second cylinder 8 by the cams 42C to 42D are different. The second camshaft 40 may be provided with cams other than the cams 42A to 42D to open and close the intake valves 35 corresponding to the first cylinder 7 and the second cylinder 8, respectively.

The plurality of exhaust cams 42Y include a plurality of opened cams having a plurality of openings 42*b* disposed on outer peripheral surfaces thereof. For example, the opened cams of the present embodiment are the cams 42B to 42D. The number of the opened cams disposed corresponding to the second cylinder 8 is larger than the number of the opened cams disposed corresponding to the first cylinder 7. The plurality of openings 42*b* are disposed corresponding to the plurality of decompression bodies 50, respectively. The plurality of openings 42*b* are disposed at different positions in the peripheral direction of the second camshaft 40. When viewed from the axial direction of the shaft body 41, first contact surfaces 50*a* of the decompression bodies 50, which are disposed corresponding to the openings 42*b* of the cams 42C and 42D, are disposed at positions spaced apart from each other in the peripheral direction of the shaft body 41.

Figure 5:
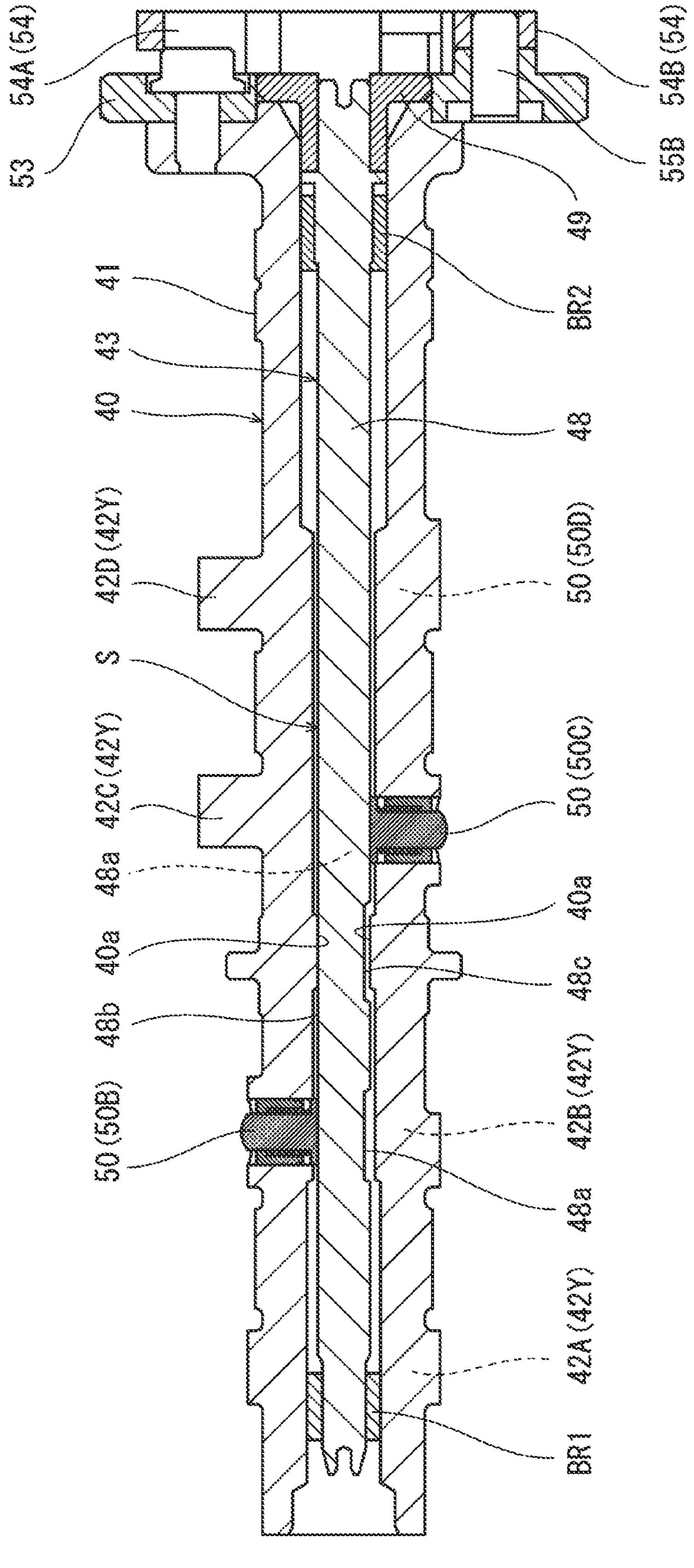
FIG. 5 is a cross-sectional view of the camshaft and the decompression shaft in FIG. 2.

FIG. 5 is a cross-sectional view of the second camshaft 40 and the decompression shaft 43 in FIG. 2. FIG. 5 shows a cross-section of the shafts 40 and 43 when viewed from the radial direction. As shown in FIG. 5, a lubrication space S is disposed between the second camshaft 40 and the decompression shaft 43 in the radial direction. Lubricating oil for lubricating an inner peripheral surface of the second camshaft 40 and an outer peripheral surface of the decompression shaft 43 is disposed in the lubrication space S. The lubricating oil is, for example, engine oil that lubricates the crankshaft 31.

The internal combustion engine E includes a plurality of bearings that are disposed inside the camshaft 40 and support the decompression shaft 43. The plurality of bearings of the present embodiment include a pair of bearings BR1 and BR2. For example, the bearings BR1 and BR2 include needle bearings, but the configuration of the bearings is not limited thereto. For example, the pair of bearings BR1 and BR2 are disposed corresponding to the one end and the other end of the shaft body 48 in the axial direction.

The second camshaft 40 has a shaft support portion 40*a* that is positioned between two adjacent cams among the plurality of cams 42 and rotatably supports the decompression shaft 43. The shaft support portion 40*a* of the present embodiment is positioned between the second cam 42B and the third cam 42C. The shaft support portion 40*a* is, for example, a diameter-reduced portion in which an inner diameter of the second camshaft 40 is partially reduced. The shaft support portion 40*a* has an inner peripheral surface extending in the axial direction of the shaft body 48. The inner peripheral surface of the shaft support portion 40*a* is, for example, a smooth surface. The inner peripheral surface of the shaft support portion 40*a* faces at least a part of an outer peripheral surface of the shaft body 48. A part of the lubricating oil in the lubrication space S is disposed between the shaft support portion 40*a* and the decompression shaft 43. As a result, the frictional resistance between the shaft support portion 40*a* and the decompression shaft 43 is reduced. A groove 48*c* in which the lubricating oil is held is disposed in a part of the outer peripheral surface of the shaft body 48 of the present embodiment facing the shaft support portion 40*a*. Since the shaft support portion 40*a* is positioned between the two adjacent cams, the deflection of the decompression shaft 43 due to a reaction force that the decompression body 50 receives from the outside during the decompression operation is appropriately reduced. As a result, the decompression body 50 can be operated more accurately. The second camshaft 40 may have a plurality of shaft support portions 40*a*.

Figure 6:
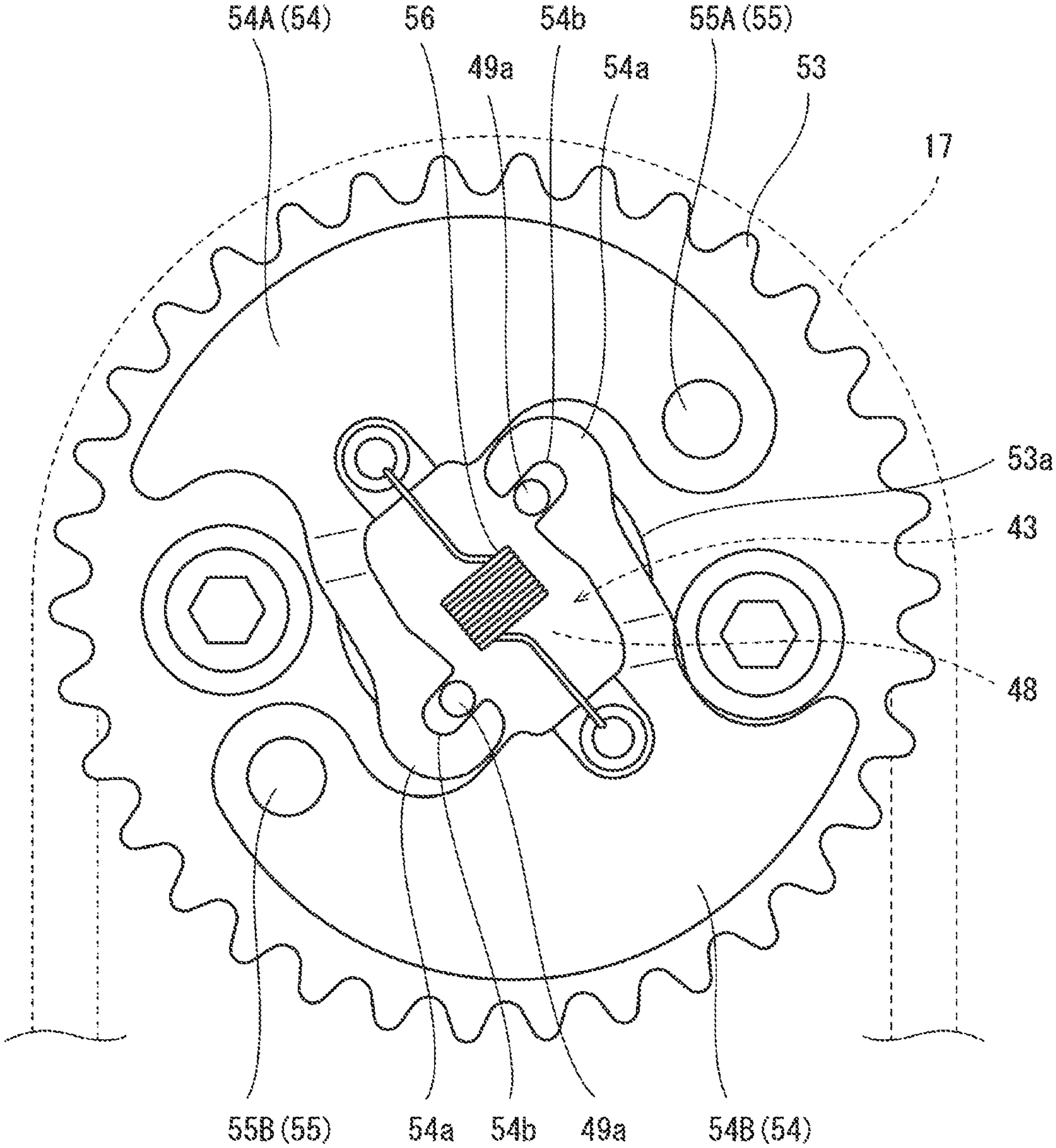
FIG. 6 is a diagram showing a state of a weight when a crankshaft in FIG. 1 rotates at a low speed.

FIG. 6 is a diagram showing a state of the weight 54 when the crankshaft 31 in FIG. 1 rotates at a low speed. FIG. 6 shows the sprocket gear 53 in a plan view: Here, the low-speed rotation state includes a rotation state of the crankshaft 31 at the time of the rotation start of the internal combustion engine E. As shown in FIG. 6, the sprocket gear 53 has an opening 53*a* through which a pair of protrusions 49*a* of the decompression shaft 43 are exposed to the outside. The pair of protrusions 49*a* are disposed apart from each other in a radial direction of the sprocket gear 53. In the plan view of the sprocket gear 53, the weight 54 includes arms 54*a* that extend from positions separated in a peripheral direction of the sprocket gear 53 with respect to positions supported by the shaft bodies 55, toward distant protrusions of the pair of protrusions 49*a* on radially outer sides of the decompression shaft 43 with respect to an axial center of the decompression shaft 43. The weight 54 is disposed at a tip of the arm 54*a* and has an engagement groove 54*b* that engages with the protrusion 49*a* via the opening 53*a*.

Figure 7:
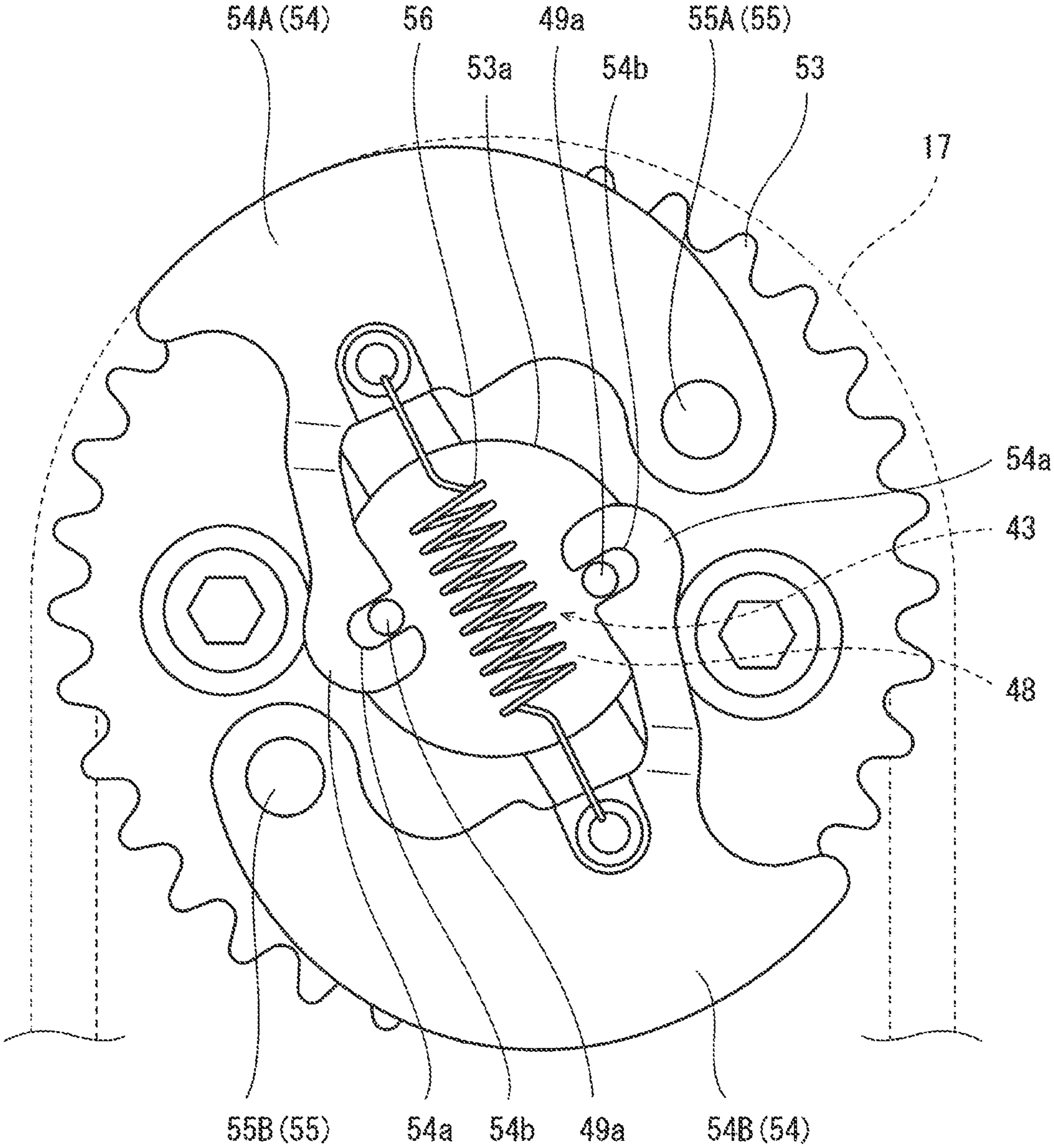
FIG. 7 is a diagram showing a state of the weight when the crankshaft in FIG. 1 rotates at a high speed.

When the sprocket gear 53 rotates about the axis of the decompression shaft 43, the pair of weights 54A and 54B rotate together with the sprocket gear 53. As a result, a centrifugal force acts on the pair of weights 54A and 54B. FIG. 7 is a diagram showing a state of the weight 54 when the crankshaft 31 in FIG. 1 rotates at a high speed. Here, the high-speed rotation state includes a rotation state of the crankshaft 31 at the time of the rotation start of the internal combustion engine E. As shown in FIG. 7, the centrifugal force increases as the rotation speed of the crankshaft 31 increases. When the rotation speed of the crankshaft 31 exceeds a predetermined decompression release speed, the centrifugal force becomes larger than the biasing force of the biasing body 56. As a result, the pair of weights 54A and 54B resists the biasing force of the biasing body 56 and swings in directions away from each other about the axes of the shaft bodies 55A and 55B. At this time, an external force applied from the pair of weights 54A and 54B is transmitted to the decompression shaft 43 via the pair of protrusions 49*a* engaged with the engagement grooves 54*b* of the pair of weights 54A and 54B. Due to this external force, the decompression shaft 43 rotates about the axis of the shaft body 48 within a certain range. As a result, the relative positions of the decompression shaft 43 and the second camshaft 40 about the axis change. Here, the decompression release speed of the present embodiment is set to a predetermined rotation speed of the crankshaft 31 obtained by starting to rotationally drive the internal combustion engine E.

When the rotation speed of the sprocket gear 53 decreases, the centrifugal force decreases. As a result, the pair of weights 54A and 54B swing in the direction of coming closer to each other by the biasing force of the biasing body 56. In this way, the relative positions of the second camshaft 40 and the decompression shaft 43 about the axis change in accordance with the rotation speed of the crankshaft 31. In the present embodiment, relative positions of the pair of weights 54A and 54B change in a reciprocating manner between a first position shown in FIG. 6 where the weights 54A and 54B are closest to each other and a second position shown in FIG. 7 where the weights 54A and 54B are farthest from each other, depending on the rotation speed of the crankshaft 31.

As shown in FIG. 4, the plurality of decompression bodies 50 of the present embodiment include a decompression body 50B disposed corresponding to the cam 42B. The decompression body 50B is disposed at a predetermined position on the outer peripheral surface of the cam 42B so as to be retractable inward of the cam 42B from the outer peripheral surface of the cam 42B. The plurality of decompression bodies 50 of the present embodiment include a pair of decompression bodies 50C and 50D disposed corresponding to the pair of cams 42C and 42D. The pair of decompression bodies 50C and 50D are disposed at different positions on outer peripheral surfaces of the pair of cams 42C and 42D so as to be retractable inward of the pair of cams 42C and 42D from the outer peripheral surfaces of the pair of cams 42C and 42D.

In the present embodiment, the arrangement of the decompression body 50B with respect to the cam 42B and the arrangement of the decompression body 50C with respect to the cam 42C are set similarly, and the arrangement of the decompression bodies 50B and 50C with respect to the cams 42B and 42C and the arrangement of the decompression body 50D with respect to the cam 42D are set differently. Here, the decompression body 50 is not disposed on the cam 42A.

Figure 8:
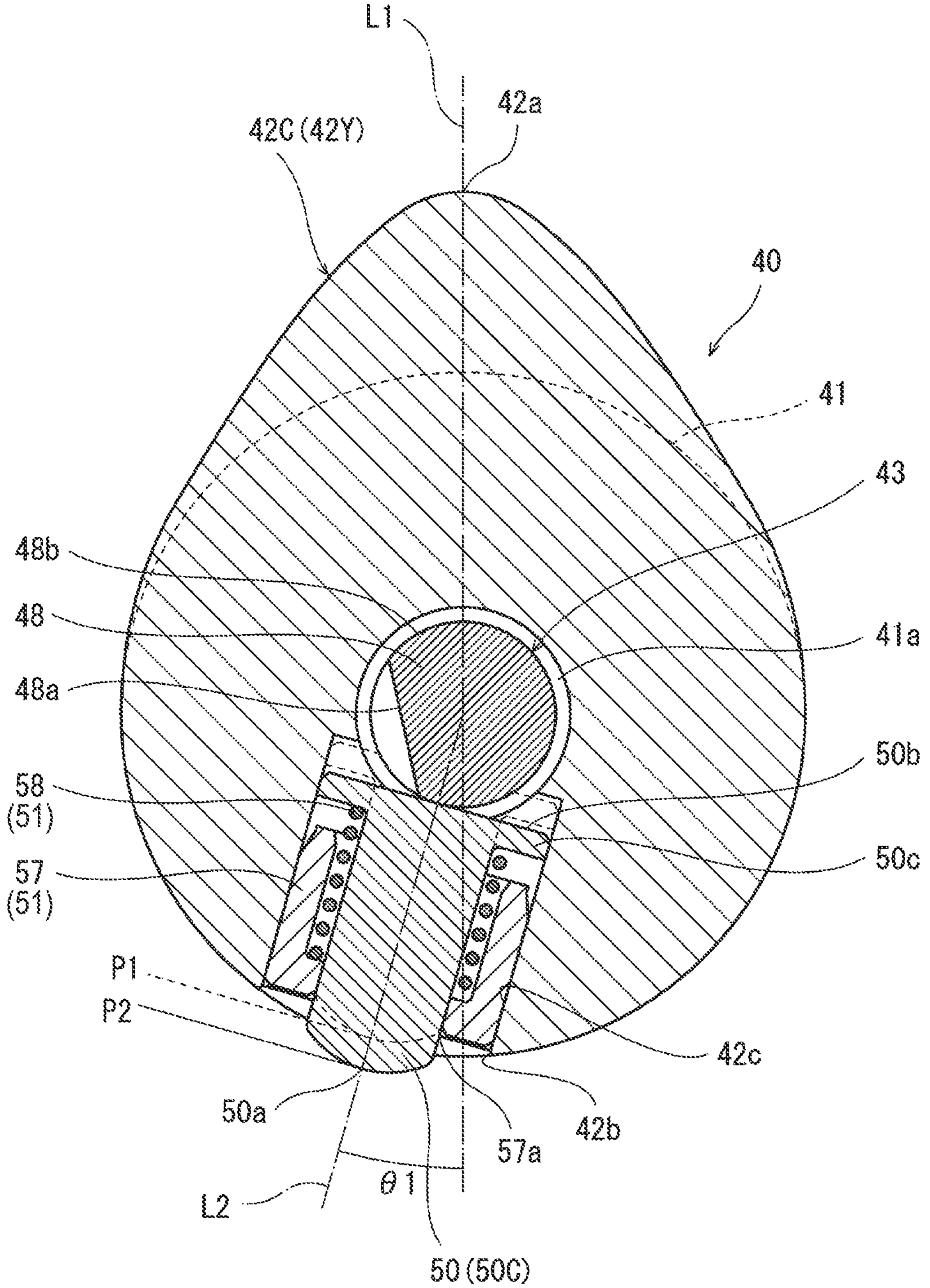
FIG. 8 is an enlarged cross-sectional view of a third cam and a decompression body in FIG. 4.
Figure 9:
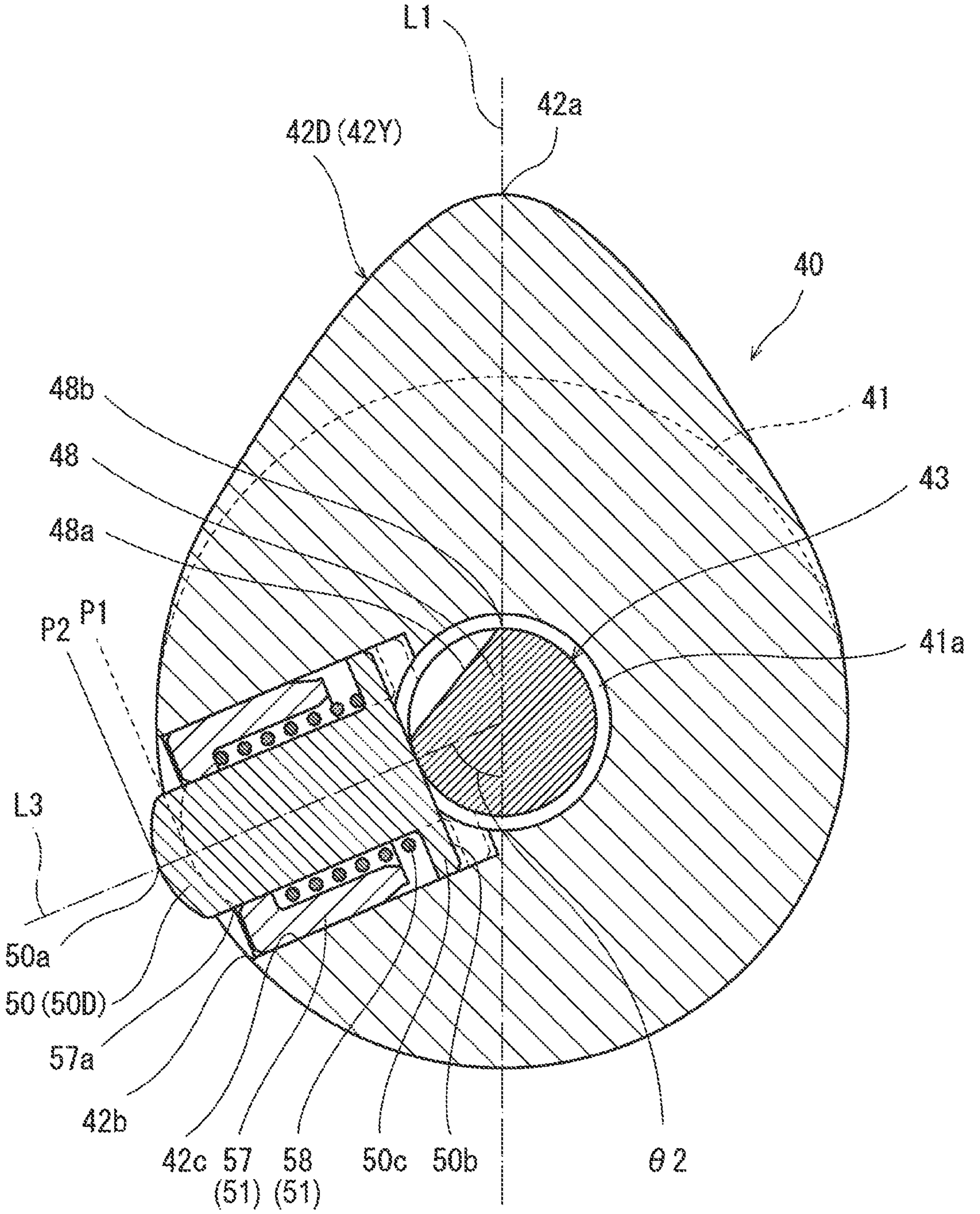
FIG. 9 is an enlarged cross-sectional view of a fourth cam and the decompression body in FIG. 4.

FIG. 8 is an enlarged cross-sectional view of the third cam 42C and the decompression body 50C in FIG. 4. FIG. 9 is an enlarged cross-sectional view of the fourth cam 42D and the decompression body 50D in FIG. 4. In FIGS. 8 and 9, the decompression bodies 50C and 50D disposed at the reference position P1 are shown by broken lines, and the decompression bodies 50C and 50D disposed at the protruding position P2 are shown by solid lines. In the present embodiment, the basic configuration including the decompression bodies 50B to 50D and the shifter 51 is the same. Therefore, the configuration shown in FIG. 8 will be described as an example with respect to the decompression bodies 50B to 50D and the shifter 51.

As shown in FIG. 8, the shifter 51 includes a sleeve 57 and a decompression biasing body 58. The sleeve 57 is disposed in an internal space of a recess 42*c* disposed in a region of the outer peripheral surface of the cam 42 substantially opposite to the cam ridge 42*a*. The recess 42*c* communicates with the opening 42*b*. The decompression body 50C is inserted into the sleeve 57. The sleeve 57 has an opening 57*a* through which a part of the decompression body 50C disposed at the protruding position P2 is exposed to the outside. The sleeve 57 guides the movement of the decompression body 50C between the reference position P1 inward of the cam 42 and the protruding position P2 protruding outward from the outer peripheral surface of the cam 42 from the reference position P1. The decompression biasing body 58 biases the decompression body 50C in a direction from the protruding position P2 toward the reference position P1 inside the sleeve 57. The biasing body 58 includes a spring, for example. The configuration of the biasing body 58 is not limited thereto.

The decompression body 50C has a columnar shape. The decompression body 50C extends in a radial direction of the shaft body 48. The decompression body 50C of the present embodiment extends in an axial direction of the sleeve 57. The decompression body 50C has the first contact surface 50*a* positioned on one side in a longitudinal direction and in contact with the valve lifter 45, and a second contact surface 50*b* positioned on the other side in the longitudinal direction and in contact with the decompression shaft 43. When viewed in the axial direction of the shaft body 48, the first contact surface 50*a* has, for example, an arc shape in which the center protrudes outward from both ends. The second contact surface 50*b* alternately comes into contact with a bottom surface of the recess 48*a* of the shaft body 48 and a peripheral surface 48*b* positioned outwardly from both sides of the bottom surface in the peripheral direction of the shaft body 48, as the decompression shaft 43 rotates about the axis thereof. The decompression body 50C has an engagement portion 50*c* that engages with the biasing body 58. The engagement portion 50*c* has, for example, a plate shape extending in a radial direction of the decompression body 50C. The biasing body 58 of the present embodiment is in contact with an opening periphery of the sleeve 57 and a plate surface of the engagement portion 50*c* while being inserted into the decompression body 50C.

As shown in FIG. 9, the decompression body 50D is disposed so as to be able to protrude outward of the fourth cam 42D from a position shifted in a peripheral direction of the fourth cam 42D with respect to a position opposite to the top portion of the cam ridge 42*a* on the outer peripheral surface of the fourth cam 42D. In the present embodiment, for example, when viewed from the axial direction of the decompression shaft 43, of inner regions of the cams 42C and 42D, the decompression bodies 50C and 50D are disposed in the same region divided by straight lines L1 passing through the top portions of the cam ridges 42*a* of the cams 42C and 42D and the axial center of the decompression shaft 43. For example, an inclination angle θ1 (see FIG. 8) of an axis L2 of the decompression body 50C with respect to the straight line L1 is smaller than an inclination angle θ2 (see FIG. 9) of an axis L3 of the decompression body 50D with respect to the straight line L1. The inclination angles θ1 and θ2 are not limited thereto, and can be appropriately adjusted.

Figure 10:
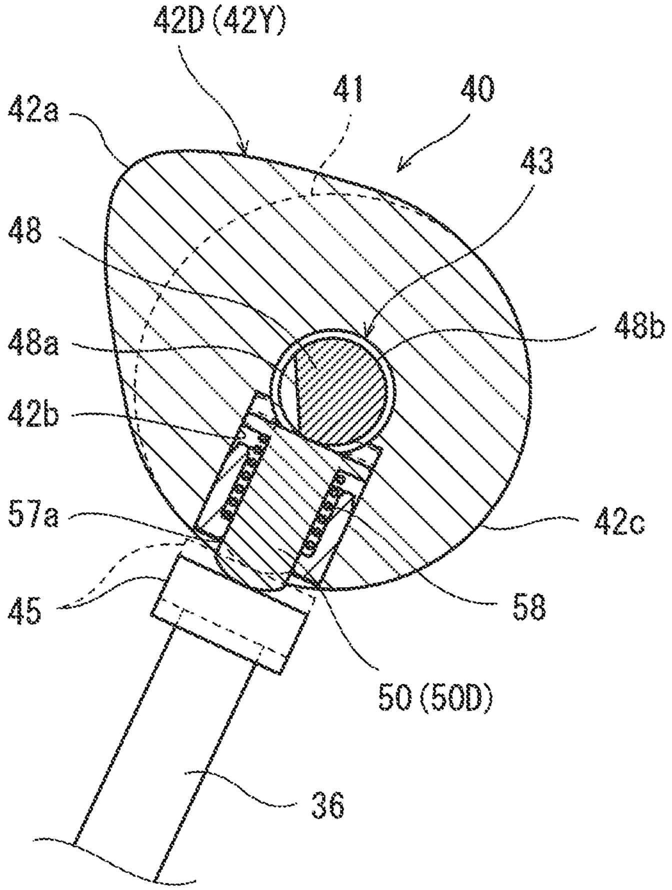
FIG. 10 is an enlarged cross-sectional view of the decompression body in FIG. 4 during a decompression operation.

FIG. 10 is an enlarged cross-sectional view of the decompression body 50 in FIG. 4 during the decompression operation. FIG. 10 shows, for example, the decompression body 50D disposed at the protruding position P2. In FIG. 10, the valve lifter 45 when the decompression body 50D is disposed at the reference position P1 is shown by a broken line. As shown in FIG. 10, when the second contact surface 50*b* of the decompression body 50 comes into contact with the peripheral surface 48*b* of the shaft body 48, an external force applied from the shaft body 48 is transmitted to the decompression body 50 and the biasing body 58. Due to this external force, the decompression body 50 moves from the reference position P1 (see FIG. 9) to the protruding position P2 against the elastic force of the biasing body 58. When the second contact surface 50*b* of the decompression body 50 comes into contact with the bottom surface of the recess 48*a* of the shaft body 48, the external force applied from the decompression shaft 43 to the decompression body 50 and the biasing body 58 is reduced or eliminated. As a result, the decompression body 50 moves from the protruding position P2 to the reference position P1 by the elastic force of the biasing body 58.

In this way, the positions P1 and P2 of the decompression body 50 change depending on relative positions of the decompression shaft 43 and the decompression body 50 in a peripheral direction of the decompression shaft 43. In the present embodiment, the plurality of recesses 48*a* of the decompression shaft 43 are disposed such that when the pair of weights 54A and 54B are disposed at the first position, the decompression body 50 is disposed at the protruding position P2, and when the pair of weights 54A and 54B are disposed at the second position, the decompression body 50 is disposed at the reference position P1.

When the decompression body 50 is positioned at the protruding position P2, the decompression body 50 protrudes outward from the outer peripheral surface of the cam 42, and the first contact surface 50*a* comes into contact with a surface of the valve lifter 45. As a result, the external force from the decompression body 50 is transmitted to the exhaust valve 36 and the biasing body 38 via the valve lifter 45. As a result, the exhaust valve 36 is pushed down toward the inside of the cylinder 30 against the elastic force of the biasing body 38, and the exhaust port 30*c* is opened. The internal space of the cylinder 30 communicates with the outside, and the gas in the cylinder 30 is discharged from the exhaust port 30*c*. As a result, a pressure increase in the cylinder 30 is prevented. In addition, the pressure in the cylinder 30 decreases with respect to the base pressure. As a result, the compression resistance of the internal combustion engine E is reduced.

When the decompression body 50 is positioned at the reference position P1, the first contact surface 50*a* is not in contact with the surface of the valve lifter 45. As a result, the external force transmitted from the decompression body 50 to the exhaust valve 36 and the biasing body 38 is eliminated. As a result, the exhaust valve 36 is moved by the biasing force of the biasing body 38, and the exhaust port 30*c* is closed again. The exhaust port 30*c* is no longer opened by the decompression body 50.

Based on the above operation, when a rotation speed of the crankshaft 31 obtained by the rotation start of the internal combustion engine E is equal to or lower than the predetermined speed, in other words, at the time when the internal combustion engine E starts to rotationally drive, the weights 54A and 54B are disposed at the first position, and the decompression body 50 is disposed at the protruding position P2. Thus, the exhaust port 30*c* is opened by the decompression body 50, thereby implementing the decompression operation. When the rotation speed of the crankshaft 31 exceeds the predetermined speed, in other words, at the time after the internal combustion engine E starts to rotationally drive, the weights 54A and 54B are disposed at the second position, and the decompression body 50 is disposed at the reference position P1. Thus, the operation of opening the exhaust port 30*c* by the decompression operation ends.

Here, in the present embodiment, during the operation of the decompression body 50, the decompression shaft 43 is appropriately supported by the shaft support portion 40*a* in the vicinity of the decompression bodies 50B and 50C. As a result, the decompression shaft 43 is prevented from being bent by the external force such as a reaction force that the decompression body 50 receives from the valve lifter 45. Therefore, the external force applied from the decompression shaft 43 can be appropriately transmitted to the decompression bodies 50. Therefore, the accurate decompression operation is implemented.

In the present embodiment, for example, the number of the decompression bodies 50 disposed corresponding to the second cylinder 8 among the plurality of decompression bodies 50 is larger than the number of the decompression bodies 50 disposed corresponding to the first cylinder 7 among the plurality of decompression bodies 50. In the present embodiment, the plurality of decompression bodies 50 disposed corresponding to the second cylinders 8 are disposed from each other by shifting a phase about the axis of the camshaft 40 (see FIG. 4). Therefore, in the second cylinder 8, the opening period during which the exhaust port 30*c* is opened by the decompression body 50, that is, the opening period of the valve can be can be longer than the first cylinder 7. As a result, in the second cylinder 8, compared with the first cylinder 7, the compression resistance can be reduced by the decompression body 50.

As described above, to increase the decompression amount in the second cylinder 8 as compared with the decompression amount in the first cylinder 7, for example, in the compression stroke of the internal combustion engine E, the decompression device 9 drives the plurality of valves so as to make the opening period of the second cylinder 8 longer than the opening period of the first cylinder 7.

Figure 11:
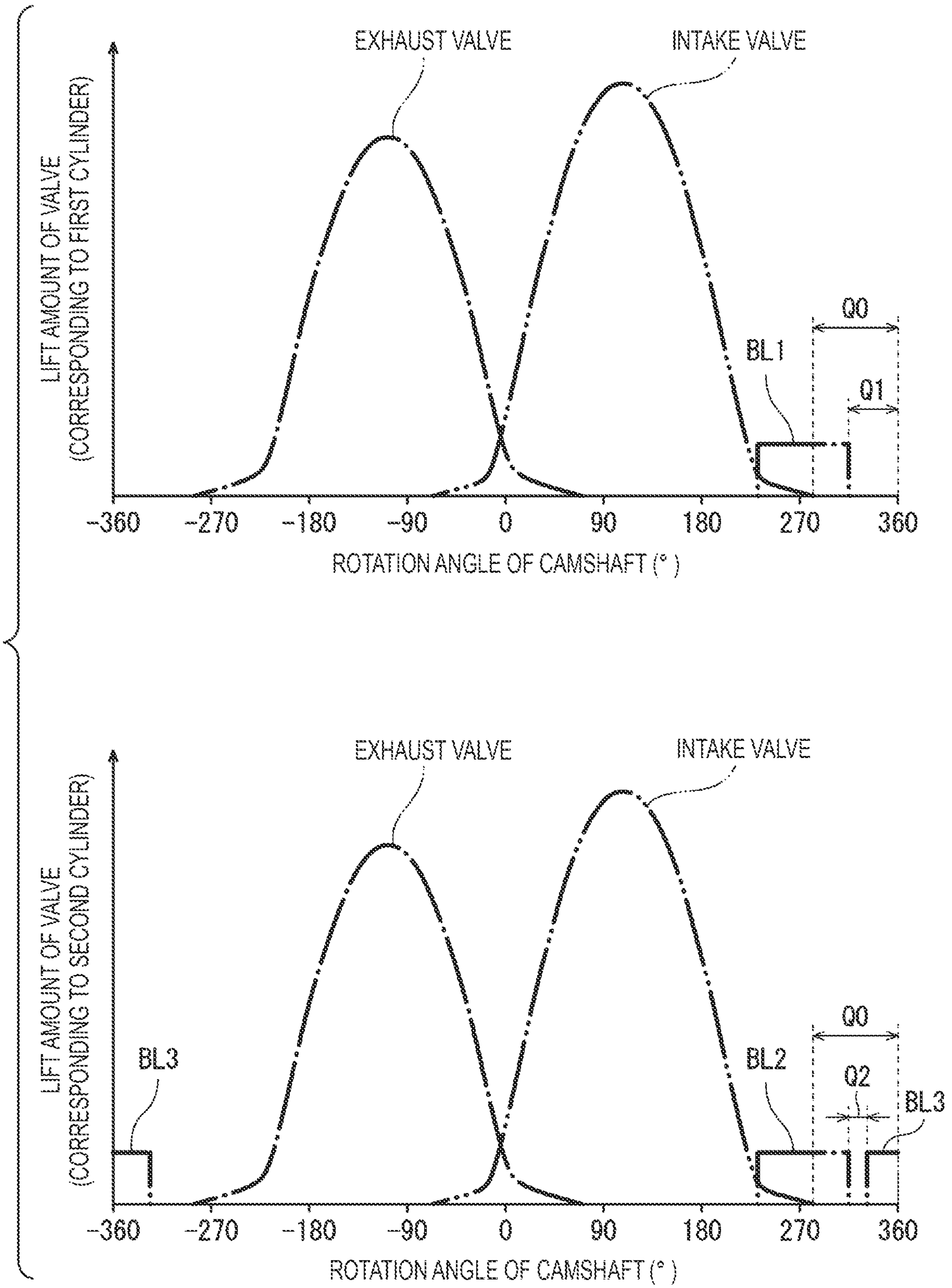
FIG. 11 is a diagram showing a relation between a rotation angle of the camshaft and a lift amount of a valve in the internal combustion engine in FIG. 1.

Hereinafter, an example of driving the valves by the decompression device 9 will be described. FIG. 11 is a diagram showing a relation between rotation angles of the camshafts 39 and 40 and lift amounts of the valves 35 and 36 in the internal combustion engine E in FIG. 1. In FIG. 11, an upper graph corresponds to the first cylinder 7, and a lower graph corresponds to the second cylinder 8. A vertical axis of each graph shows a change in the lift amount of the intake valve 35 and the exhaust valve 36. A horizontal axis of each graph shows a rotation angle range about the axis with respect to a predetermined reference angle of the camshaft 40 that rotates twice during one cycle of the operation period of the internal combustion engine E.

In FIG. 11, the lift amount of the exhaust valve 36 by the decompression body 50B is shown by a graph line BL1. A graph line BL2 shows the lift amount of the exhaust valve 36 by the decompression body 50C. A graph line BL3 shows the lift amount of the exhaust valve 36 by the decompression body 50D. In FIG. 11, a compression period Q0 in the case where there is no decompression operation is shown in each graph. In FIG. 11, for convenience, in the first cylinder 7 and the second cylinder 8, lift timings of the intake valves 35 by the cams 42X are matched, and lift timings of the exhaust valves 36 by the cams 42Y are matched. The lift timings of the present embodiment are set to be shifted from one another.

As shown in FIG. 11, in the internal combustion engine E of the present embodiment, during one cycle of the operation period, the decompression operation is performed using the exhaust valve 36 in both the first cylinder 7 and the second cylinder 8. For example, the number of decompression operations corresponding to the second cylinder 8 in the one cycle is larger than the number of decompression operations corresponding to the first cylinder 7 in the one cycle. In the present embodiment, a plurality of decompression operations are performed for the second cylinder 8 in the one cycle. The plurality of decompression operations include two decompression operations, but may include three or more decompression operations.

In the present embodiment, by setting the number of decompression operations as described above, the opening period of the valves corresponding to the second cylinder 8 in the one cycle is longer than the opening period of the valves corresponding to the first cylinder 7 in the one cycle. In other words, a compression period Q2 of the decompression operation corresponding to the second cylinder 8 in the one cycle is shorter than the compression period Q1 of the decompression operation corresponding to the first cylinder 7 in the one cycle.

As a result, the pressures inside the first cylinder 7 and the second cylinder 8 are reduced at the time when the internal combustion engine E starts to rotationally drive as compared with those of the time after the internal combustion engine E starts to rotationally drive. Further, during the one cycle, the decompression amount in the second cylinder 8 is increased compared with the decompression amount in the first cylinder 7. As a result, for example, by performing combustion in the combustion chamber 30*a* of the first cylinder 7, the rotational drive force of the internal combustion engine E is obtained, and the compression resistance of the second cylinder 8 is reduced to be lower than the compression resistance of the first cylinder 7, thereby reducing the compression resistance of the entire internal combustion engine E. As a result, the rotation starting performance of the internal combustion engine E is improved.

Here, for example, when an ISG is used as a starting motor of the internal combustion engine E, it may be required to improve the starting performance of the internal combustion engine E since the torque of the starting motor is low: In the internal combustion engine E, it may be required to improve the starting performance depending on design conditions, usage conditions, and the like. The usage situations here include, for example, a case where the internal combustion engine E is returned from an idling stop state, and a case where the traveling mode is switched from the first traveling mode to the second traveling mode to suddenly start the internal combustion engine E while the vehicle 1 is traveling. According to the present embodiment, since the rotation starting performance of the internal combustion engine E is improved by the decompression device 9, a rotation speed of the internal combustion engine E can be increased in a short time from the start of the internal combustion engine E. Therefore, it is possible to appropriately cope with such conditions. In the case where the traveling mode is switched from the first traveling mode to the second traveling mode to start the internal combustion engine E while the vehicle 1 is traveling, it is possible to prevent the traveling feeling of the occupant of the vehicle 1 from deteriorating due to the rotation speed of the internal combustion engine E not sufficiently increasing. According to the present embodiment, the decompression device 9 automatically operates in accordance with the rotation speed of the crankshaft 31. Therefore, for example, it is not necessary for a user of the internal combustion engine E or the occupant of the vehicle 1 to perform the operation of reducing the compression resistance of the second cylinder 8 to be lower than the compression resistance of the first cylinder 7 at the time when the internal combustion engine E starts to rotationally drive.

In the present embodiment, the plurality of decompression bodies 50 disposed corresponding to the second cylinder 8 are disposed from each other by shifting the phase about the axis of the camshaft 40. Therefore, as can be seen from the graph lines BL2 and BL3, among the plurality of decompression operations in the one cycle, a preceding decompression operation and another decompression operation that follows thereto are separated from each other.

The timings at which the plurality of decompression operations are performed are adjusted by positions of the plurality of recesses 48*a* in the peripheral direction of the decompression shaft 43. For example, when intervals between the plurality of recesses 48*a* in the peripheral direction of the decompression shaft 43 are increased as viewed in the axial direction of the decompression shaft 43, the time period between a preceding decompression operation and another decompression operation that follows thereto is extended. When the intervals between the plurality of recesses 48*a* are reduced, the time period between the preceding decompression operation and another decompression operation that follows thereto is reduced. When the plurality of recesses 48*a* in the peripheral direction of the decompression shaft 43 are disposed so as to partially overlap as viewed in the axial direction of the decompression shaft 43, the time period for each decompression operation can be extended. In the present embodiment, for example, there is a timing at which the intake valve 35 and the exhaust valve 36 are simultaneously opened in the plurality of decompression operations in the one cycle. The plurality of decompression operations in the one cycle may be performed at timings when the intake valve 35 is not opened.

The plurality of decompression bodies 50 may include, for example, the decompression bodies 50 having different shapes. In this case, for example, the shapes of the decompression bodies 50 disposed corresponding to the first cylinder 7 and the decompression bodies 50 disposed corresponding to the second cylinder 8 may be different from each other. In the present embodiment, one decompression body 50 is disposed for one cam 42, but two or more decompression bodies 50) may be disposed for one cam 42. In this case, two or more of the decompression bodies 50 may be disposed apart from each other in the peripheral direction of one cam 42 with respect to the outer peripheral surface of the cam 42 at a position spaced apart from the cam ridge 42*a*. In the present embodiment, when the external force applied from the decompression body 50 is transmitted to the exhaust valve 36, the exhaust port 30*c* is opened and the decompression operation is performed, but the intake port 30*b* may be opened and the decompression operation may be performed when the external force applied from the decompression body 50 is transmitted to the intake valve 35.

A method of increasing the decompression amount in the second cylinder 8 as compared with the decompression amount in the first cylinder 7 by the decompression device 9 is not limited to a method of driving the plurality of valves in which the opening period of the second cylinder 8 is longer than the opening period of the first cylinder 7 in the compression stroke of the internal combustion engine E. For example, in the compression stroke of the internal combustion engine E, the decompression device 9 may drive the plurality of valves such that the lift amount of the valve disposed corresponding to the second cylinder 8 is larger than the lift amount of the valve disposed corresponding to the first cylinder 7.

In other words, the lift amount of the valve refers to, for example, an opening amount of the ports 30*b* and 30*c* by the valves 35 and 36. The opening amount of the ports 30*b* and 30*c* is proportional to a flow rate of a gas passing through the ports 30*b* and 30*c* per unit time within a certain range. The decompression device 9 can increase the lift amount of the valve by, for example, adjusting the protruding position P2 of the decompression body 50 so as to increase the amount of protrusion of the decompression body 50 from the outer peripheral surface of the cam 42.

As the method of increasing the decompression amount in the second cylinder 8 as compared with the decompression amount in the first cylinder 7 by the decompression device 9, for example, a method of making opening diameters of the ports 30*b* and 30*c* of the second cylinder 8 larger than opening diameters of the ports 30*b* and 30*c* of the first cylinder 7 may be adopted.

The internal combustion engine E may include a single cylinder 30. In this case, the plurality of decompression bodies 50 may be disposed at different positions of the outer peripheral surfaces of the pair of cams 42C and 42D around the axis of the shaft body 41 so as to be retractable inward of the pair of cams 42C and 42D from the outer peripheral surfaces of the pair of cams 42C and 42D. As a result, at the time when the internal combustion engine E starts to rotationally drive, by operating the plurality of decompression bodies 50 at different timings, a force required for the rotation start of the crankshaft 31 can be easily obtained, so that the starting performance of the internal combustion engine E can be improved. First and second modifications of the present embodiment will be described below.

(First Modification)

A vehicle according to the first modification is a series hybrid vehicle. The vehicle includes the generator G that generates electric power using a drive force of the internal combustion engine E, the electric motor M for traveling driven by the output of the generator G, and the drive wheel DW driven by the output of the electric motor M. The vehicle further includes the storage battery B connected to the generator G and the electric motor M. The storage battery B is charged by the output of at least one of the generator G and the electric motor M. The storage battery B supplies electric power to the electric motor M during traveling. The internal combustion engine E includes the decompression device 9 similar to that of the first embodiment.

In the vehicle according to the first modification, the same effects as those of the vehicle 1 of the first embodiment can also be obtained. Even in a case where the electric motor M for traveling is driven by the output of the generator G that generates electric power using the drive force of the internal combustion engine E and the drive wheel DW is driven by the electric motor M, the vehicle can be quickly shifted to a state in which traveling is possible by improving the starting performance of the internal combustion engine E. Even when the crankshaft 31 is started to rotationally drive by an external force applied from a person, the same effects can be obtained.

(Second Modification)

In a vehicle according to the second modification, the control device 14 further controls a combustion state in the second cylinder 8 such that the combustion state in the second cylinder 8 is different between at the time of the rotation start of the internal combustion engine E and at the time after the rotation start of the internal combustion engine E, as compared with the vehicle 1 of the first embodiment. For example, the control device 14 controls the combustion state in the second cylinder 8 at the time of the rotation start of the internal combustion engine E to be gentler than the combustion state in the second cylinder 8 after the time of the rotation start of the internal combustion engine E. The description "controls . . . to be gentler than" includes, for example, controlling the fuel injector F so as to reduce the amount of fuel supplied into the second cylinder 8. For example, controlling the electronically controlled throttle T so as to reduce the amount of intake air of the second cylinder 8 is also included. For example, controlling the ignition device I so as to stop combustion in the second cylinder 8 is also included. After the internal combustion engine E starts to rotationally drive, the control device 14 controls combustion states of the first cylinder 7 and the second cylinder 8 in the same manner.

In the vehicle according to the second modification, the same effects as those of the first embodiment can be obtained. By using the control device 14 that controls the combustion state in the second cylinder 8, for example, at the time when the internal combustion engine E starts to rotationally drive, fuel combustion in the second cylinder 8 is stopped, fuel supply to the second cylinder 8 is stopped, or the combustion scale in the second cylinder 8 is reduced as compared with that of the time after the internal combustion engine E starts to rotationally drive. As a result, the fuel consumption of the internal combustion engine E can be reduced, and the unburned gas in the second cylinder 8 can be prevented or avoided from flowing out to the outside. Hereinafter, differences between a second embodiment and the first embodiment will be mainly described.

Second Embodiment

The internal combustion engine E of a vehicle according to the second embodiment includes the decompression device 9 including the same number of the decompression bodies 50 disposed corresponding to the first cylinder 7 and the second cylinder 8. The decompression device 9 includes a cylindrical camshaft to which a pair of cams are attached, and a decompression shaft that is inserted into the camshaft, is rotatably supported about an axis of the camshaft independently of the camshaft, and applies, to the plurality of decompression bodies 50, an external force for shifting the decompression bodies 50.

The decompression device 9 of the second embodiment includes the second camshaft 40 to which the second cam 42B and the third cam 42C are attached as a pair of cams. For example, the decompression device 9 includes the decompression body 50B disposed corresponding to the second cam 42B and the decompression body 50C disposed corresponding to the third cam 42C. The second camshaft 40 has the shaft support portion 40*a* that is positioned between the pair of cams and rotatably supports the decompression shaft 43 (see FIG. 5). In the decompression device 9 of the second embodiment, the decompression body 50D is omitted for example. The shaft support portion 40*a* of the second embodiment has the same configuration as that of the first embodiment.

According to the internal combustion engine E of the second embodiment, the decompression shaft 43 is appropriately supported by the shaft support portion 40*a* in the vicinity of the decompression bodies 50B and 50C. As a result, the decompression shaft 43 is prevented from being bent inside the second camshaft 40 due to an external force such as a reaction force that the decompression body 50 receives from the valve lifter 45. Therefore, the decompression shaft 43 is stably supported by the second camshaft 40. Therefore, the external force applied from the decompression shaft 43 can be appropriately transmitted to the decompression body 50, and the decompression body 50 can be accurately moved between the reference position P1 and the protruding position P2. As a result, it is possible to prevent the amount of protrusion of the decompression body 50 from becoming insufficient, so that accurate decompression operation is implemented. Therefore, it is possible to prevent the reduction of the compression resistance of the internal combustion engine E from being insufficient due to the decompression operation not being performed appropriately at the time of the rotation start of the internal combustion engine E. As a result, the rotation starting performance of the internal combustion engine E is improved. Hereinafter, a third modification, which is a modification of the second embodiment, will be described.

(Third Modification)

The internal combustion engine E of a vehicle according to the third modification includes a single cylinder 30. The decompression device 9 of the internal combustion engine E includes the second camshaft 40 to which the third cam 42C and the fourth cam 42D are attached as a pair of cams. The second camshaft 40 has the shaft support portion 40*a* that is positioned between the pair of cams and rotatably supports the decompression shaft 43. That is, the shaft support portion 40*a* of the present modification is disposed correspondingly between the third cam 42C and the fourth cam 42D.

In the vehicle of the third modification having the above configuration, the same effects as those of the second embodiment are obtained. That is, since the decompression shaft 43 is prevented from being bent inside the second camshaft 40 due to an external force such as a reaction force that the decompression body 50 receives from the valve lifter 45, the external force applied from the decompression shaft 43 can be appropriately transmitted to the decompression body 50. As a result, an accurate decompression operation is implemented.

As described above, embodiments and modifications have been described as examples of the technology disclosed in the present application. However, the technology in the present disclosure is not limited thereto, and can also be applied to embodiments in which changes, replacements, additions, omissions, and the like are made as appropriate. It is also possible to create a new embodiment by combining the components described in the embodiments and the modifications. For example, a part of a configuration in one embodiment may be applied to another configuration, and a part of a configuration in an embodiment can be freely extracted separately from another configuration in the embodiment. In addition, the components described in the attached drawings and the detailed description include not only components that are essential for solving the problem but also components that are not essential for solving the problem, in order to exemplify the technology.

(Disclosure Items)

The following items are disclosures of preferred embodiments.

[Item 1] An internal combustion engine includes: a crankshaft: a first cylinder and a second cylinder: and a decompression device configured to depressurize the first cylinder and the second cylinder at a time when the internal combustion engine starts to rotationally derive relative to the first cylinder and the second cylinder at a time after the internal combustion engine starts to rotationally drive. The decompression device is configured such that, at the time when the internal combustion engine starts to rotationally derive, a decompression amount in the second cylinder is greater than a decompression amount in the first cylinder.

According to the above configuration, at the time when the internal combustion engine starts to rotate, the decompression device depressurizes both the first cylinder and the second cylinder relative to those at the time after the internal combustion engine starts to rotationally drive. As a result, the compression resistance at the time when the internal combustion engine starts to rotationally drive can be reduced as compared with a case where only a single cylinder is depressurized at the time after the internal combustion engine starts to rotate. In the first cylinder in which the decompression amount is smaller than that in the second cylinder, the explosive power during combustion is increased as compared with the second cylinder. As a result, a force required to rotate the crankshaft can be easily generated. In other words, in the second cylinder in which the decompression amount is larger than that in the first cylinder, the force required to rotate the crankshaft is small. Therefore, in the second cylinder, the decompression amount can be further increased as compared with the first cylinder. Therefore, an effect of reducing the compression resistance can be enhanced. As a result, at the time when the internal combustion engine starts to rotationally drive, the force required to rotate the crankshaft can be obtained, and the compression resistance can be further reduced.

[Item 2] The internal combustion engine according to item 1, further includes: a plurality of valves configured to open and shut off combustion chambers of the first cylinder and the second cylinder to an outside of the combustion chambers. The decompression device drives the plurality of valves in a compression stroke of the internal combustion engine such that an opening period of the second cylinder is longer than an opening period of the first cylinder.

According to the above configuration, since the plurality of valves are driven by the decompression device at the time when the internal combustion engine starts to rotationally drive, the decompression amount in the second cylinder can be increased as compared with the decompression amount in the first cylinder. In the compression stroke of the internal combustion engine, since the decompression device increases the decompression amount in the second cylinder as compared with the decompression amount in the first cylinder by making the opening periods of the first and second cylinders different from each other, it is possible to prevent the influence on a stroke other than the compression stroke of the internal combustion engine and increase the decompression amount in the second cylinder.

[Item 3] The internal combustion engine according to item 1 or 2, further includes: a plurality of valves configured to open and shut off combustion chambers of the first cylinder and the second cylinder to an outside of the combustion chambers: and a plurality of cams configured to rotate about a predetermined axis to apply a drive force to the plurality of valves. The decompression device includes: a plurality of decompression bodies disposed corresponding to each of the first cylinder and the second cylinder, and configured to be shifted between a reference position inward of the plurality of cams and a protruding position protruding outward from outer peripheral surfaces of the plurality of cams, and a shifter configured to shift the plurality of decompression bodies between the reference position and the protruding position in accordance with a rotation speed of the crankshaft.

According to the above configuration, it is possible to change the amount of protrusion of the decompression body protruding outward from the outer peripheral surface of the cam in accordance with the rotation speed of the crankshaft. As a result, at the time when the internal combustion engine starts to rotationally drive, the opening time of the valve can be extended as compared with that at the time after the internal combustion engine starts to rotationally drive. In addition, the decompression amounts in the first cylinder and the second cylinder at the time when the internal combustion engine starts to rotationally drive can be easily adjusted by the decompression bodies disposed corresponding to the first cylinder and the second cylinder, respectively.

[Item 4] The internal combustion engine according to item 3, among the plurality of decompression bodies, the number of the decompression bodies disposed corresponding to the second cylinder is larger than the number of the decompression bodies disposed corresponding to the first cylinder.

According to the above configuration, at the time when the internal combustion engine starts to rotationally drive, a composite body including the cam and the decompression body disposed corresponding to the second cylinder can be made larger than a composite body including the cam and the decompression body disposed corresponding to the first cylinder. This makes it easier to increase the decompression amount in the second cylinder than in the first cylinder.

[Item 5] The internal combustion engine according to item 3 or 4, the plurality of cams include a pair of cams disposed corresponding to the second cylinder, and the plurality of decompression bodies include a pair of decompression bodies disposed corresponding to the pair of cams.

According to the above configuration, for example, as compared with a case where the plurality of decompression bodies are disposed corresponding to a single cam, the decompression body can be easily disposed corresponding to the cam. As a result, for example, the decompression body can be easily accommodated inside the cam. As a result, assembly of the internal combustion engine can be facilitated.

[Item 6] The internal combustion engine according to item 5, the pair of decompression bodies are each disposed at a different position on outer peripheral surfaces of the pair of cams to be retractable inward of the pair of cams from the outer peripheral surfaces of the pair of cams.

According to the above configuration, by using the pair of decompression bodies disposed so as to be retractable inward of the pair of cams from the outer peripheral surfaces of the pair of cams, the valves disposed corresponding to the second cylinder can be operated at different timings. As a result, the opening periods of the valves in the entire second cylinder can be increased when the internal combustion engine starts to rotate. In addition, for example, as compared with a case where the pair of decompression bodies are disposed so as to be retractable inward of the pair of cams from an outer peripheral surface of a single cam, an outer shape of the composite body including the cam and the decompression body can be prevented from changing as compared with an outer shape of only the cam. Therefore, the internal combustion engine can be manufactured easily.

[Item 7] The internal combustion engine according to any one of items 3 to 6, the plurality of decompression bodies have the same structure.

According to the above configuration, components of the internal combustion engine can be shared. Therefore, by reducing the number of the components, the manufacturing cost of the internal combustion engine can be reduced.

[Item 8] The internal combustion engine according to any one of items 3 to 7, further includes: a single camshaft to which all the decompression bodies and all the plurality of cams corresponding to all the decompression bodies are attached.

According to the above configuration, the camshaft to which the cams for disposing the plurality of decompression bodies are attached can be combined. As a result, a configuration of the shifter that shifts the plurality of decompression bodies between the reference position and the protruding position can be easily made common. Therefore, for example, the structure of the internal combustion engine can be simplified as compared with a case where at least two or more decompression bodies are disposed corresponding to a plurality of camshafts, respectively.

[Item 9] The internal combustion engine according to any one of items 3 to 8, the decompression device includes: a cylindrical camshaft to which the plurality of cams are attached, and a decompression shaft inserted into the camshaft, rotatably supported about an axis of the camshaft independently of the camshaft, and configured to apply, to the plurality of decompression bodies, an external force for shifting the decompression bodies. The camshaft has a shaft support portion that is positioned between two adjacent cams among the plurality of cams and rotatably supports the decompression shaft.

According to the above configuration, during the operation of the decompression body, the decompression shaft is appropriately supported in the vicinity of the decompression body by the shaft support portion positioned between two adjacent cams among the plurality of cams. As a result, the decompression shaft is prevented from being bent due to an external force applied to the decompression body from the outside. Therefore, the external force applied from the decompression shaft can be appropriately transmitted to the decompression body. As a result, an accurate decompression operation is implemented. Therefore, it is possible to prevent the reduction of the compression resistance of the internal combustion engine from being insufficient due to the decompression operation not being performed appropriately when the internal combustion engine starts to rotate.

[Item 10] The internal combustion engine according to any one of items 1 to 9, further includes: a control device configured to control a combustion state in the second cylinder such that the combustion state is different between at the time when the internal combustion engine starts to rotationally drive and at the time after the internal combustion engine starts to rotationally drive.

According to the above configuration, by using the control device that controls the combustion state in the second cylinder, for example, at the time when the internal combustion engine E starts to rotationally drive, fuel combustion in the second cylinder is stopped, fuel supply to the second cylinder is stopped, or the combustion scale in the second cylinder is reduced as compared with that after the internal combustion engine starts to rotate. As a result, the fuel consumption of the internal combustion engine can be reduced, and the unburned gas in the second cylinder can be prevented or avoided from flowing out to the outside.

[Item 11] The internal combustion engine according to any one of items 1 to 10, further includes: a starting motor configured to generate electric power using a drive force of the crankshaft and rotate the crankshaft at the time when the internal combustion engine starts to rotationally drive.

Here, as the starting motor, for example, an ISG motor can be used. Such a starting motor has a transmission structure different from that of a motor having no power generation function. Therefore, the starting motor may have a small starting torque when the power generation function is prioritized. In contrast, according to the above configuration, at the time when the internal combustion engine starts to rotationally drive, since a force required to rotate the crankshaft can be obtained and the compression resistance can be further reduced, the crankshaft can be rotated quickly even if the starting torque of the starting motor is small. Therefore, the starting performance of the internal combustion engine having a plurality of cylinders can be improved.

[Item 12] An internal combustion engine includes: a crankshaft: a cylinder: a plurality of valves configured to open and shut off a combustion chamber of the cylinder to an outside of the combustion chamber: a decompression device configured to depressurize the cylinder at a time when the internal combustion engine starts to rotationally drive relative to the cylinder at a time after the internal combustion engine starts to rotationally drive: and a pair of cams configured to rotate about a predetermined axis to apply a drive force to the plurality of valves. The decompression device includes a plurality of decompression bodies disposed corresponding to the cylinder, and configured to be shifted between a reference position inward of the pair of cams and a protruding position protruding outward from outer peripheral surfaces of the pair of cams. The plurality of decompression bodies are each disposed at a different position on the outer peripheral surfaces of the pair of cams to be retractable inward of the pair of cams from the outer peripheral surfaces of the pair of cams.

According to the above configuration, at the time when the internal combustion engine starts to rotationally drive, by operating the plurality of decompression bodies of the decompression device at different timings, the force required to start the rotation of the crankshaft can be easily obtained. In addition, the compression resistance at the time when the internal combustion engine starts to rotationally drive can be easily reduced. As a result, the starting performance of the internal combustion engine can be improved.

[Item 13] The internal combustion engine according to item 12, the decompression device includes: a cylindrical camshaft to which the pair of cams are attached, and a decompression shaft inserted into the camshaft, rotatably supported about an axis of the camshaft independently of the camshaft, and configured to apply, to the plurality of decompression bodies, an external force for shifting the decompression bodies. The camshaft has a shaft support portion that is positioned between the pair of cams and rotatably supports the decompression shaft.

According to the above configuration, during the operation of the decompression body, the decompression shaft is appropriately supported in the vicinity of the decompression body by the shaft support portion positioned between the pair of cams. As a result, the decompression shaft is prevented from being bent due to an external force applied to the decompression body from the outside. Therefore, the external force applied from the decompression shaft can be appropriately transmitted to the decompression body. As a result, an accurate decompression operation is implemented. Therefore, it is possible to prevent the reduction of the compression resistance of the internal combustion engine from being insufficient due to the decompression operation not being performed appropriately when the internal combustion engine starts to rotate.

[Item 14] A vehicle includes: a first drive source for traveling, which is the internal combustion engine according to any one of items 1 to 13: and a second drive source for traveling, which is different from the first drive source. The first drive source is startable while the vehicle is traveling by the second drive source.

According to the above configuration, in the vehicle including the first drive source which is the internal combustion engine having a plurality of cylinders and the second drive source for traveling different from the first drive source, the starting performance of the first drive source while the vehicle is traveling by the second drive source is improved. Therefore, it is possible to accelerate the start of the first drive source while the vehicle is traveling by the second drive source. As a result, in a case where a traveling mode is switched from a traveling mode by the second drive source to a traveling mode by the first drive source while the vehicle is traveling by the second drive source, it is possible to prevent the traveling feeling of an occupant of the vehicle from deteriorating due to a rotation speed of the internal combustion engine not sufficiently increasing.

[Item 15] A vehicle includes an internal combustion engine. The internal combustion engine includes: a crankshaft: a first cylinder and a second cylinder: and a decompression device configured to depressurize the first cylinder and the second cylinder at a time when the internal combustion engine starts to rotationally derive relative to the first cylinder and the second cylinder at a time after the internal combustion engine starts to rotationally drive. The decompression device is configured such that, at the time when the internal combustion engine starts to rotationally derive, a decompression amount in the second cylinder is greater than a decompression amount in the first cylinder. The internal combustion engine is started by the rotation of the crankshaft.

According to the above configuration, in the internal combustion engine included in the vehicle, a force required to rotate the crankshaft can be obtained, and the compression resistance can be further reduced. Therefore, for example, the vehicle can be smoothly started.

[Item 16] The vehicle according to item 12 or 13, further includes: a generator configured to generate electric power using a drive force of the internal combustion engine: an electric motor for traveling configured to be driven by output of the generator: a storage battery connected to the generator and the electric motor: and a drive wheel configured to be driven by the output of the electric motor.

According to the above configuration, even in a case where the electric motor for traveling is driven by the output of the generator that generates electric power using the drive force of the internal combustion engine and the drive wheel is driven by the electric motor, the vehicle can be quickly shifted to a state in which traveling is possible by improving the starting performance of the internal combustion engine.

[Item 17] An internal combustion engine includes: a crankshaft: a first cylinder and a second cylinder: a plurality of valves configured to open and shut off combustion chambers of the first cylinder and the second cylinder to an outside of the combustion chambers: a valve operating device including a camshaft rotating about an axis of the camshaft by transmitting a rotational drive force from the crankshaft, and configured to operate the plurality of valves in at least one of an intake stroke and an exhaust stroke; and a decompression device configured to depressurize the first cylinder and the second cylinder at a time when the internal combustion engine starts to rotationally derive relative to the first cylinder and the second cylinder at a time after the internal combustion engine starts to rotationally drive. The decompression device includes: a plurality of decompression bodies disposed corresponding to each of the first cylinder and the second cylinder, and configured to be shifted between a reference position inward of the plurality of cams and a protruding position protruding outward from outer peripheral surfaces of the plurality of cams, and a shifter configured to shift the plurality of decompression bodies between the reference position and the protruding position in accordance with a rotation speed of the crankshaft. At least one of the valves is opened by an external force transmitted from at least one of the decompression bodies, thereby increasing a decompression amount in the second cylinder as compared with a decompression amount in the first cylinder.

What is claimed is:

1. An internal combustion engine comprising:
- a crankshaft;
- a first cylinder and a second cylinder;
- a decompression device configured to depressurize the first cylinder and the second cylinder at a time when the internal combustion engine starts to rotationally derive relative to the first cylinder and the second cylinder at a time after the internal combustion engine starts to rotationally drive;
- a plurality of valves configured to open and shut off combustion chambers of the first cylinder and the second cylinder to an outside of the combustion chambers; and
- a plurality of cams configured to rotate about a predetermined axis to apply a drive force to the plurality of valves, wherein
- the decompression device is configured such that, at the time when the internal combustion engine starts to rotationally derive, a decompression amount in the second cylinder is greater than a decompression amount in the first cylinder,
- the decompression device includes:
  - a plurality of decompression bodies disposed corresponding to each of the first cylinder and the second cylinder, and configured to be shifted between a reference position inward of the plurality of cams and a protruding position protruding outward from outer peripheral surfaces of the plurality of cams;
  - a shifter configured to shift the plurality of decompression bodies between the reference position and the protruding position in accordance with a rotation speed of the crankshaft;
  - a cylindrical camshaft to which the plurality of cams are attached; and
  - a decompression shaft inserted into the camshaft, rotatably supported about an axis of the camshaft independently of the camshaft, and configured to apply a predetermined external force to the plurality of decompression bodies, and
  - the camshaft has a shaft support portion that is positioned between two adjacent cams among the plurality of cams, the shaft support portion rotatably supporting the decompression shaft.

2. The internal combustion engine according to claim 1, further comprising:
- a plurality of valves configured to open and shut off combustion chambers of the first cylinder and the second cylinder to an outside of the combustion chambers, wherein
- the decompression device drives the plurality of valves in a compression stroke of the internal combustion engine such that an opening period of the second cylinder is longer than an opening period of the first cylinder.

3. The internal combustion engine according to claim 1, wherein
- among the plurality of decompression bodies, a number of the decompression bodies disposed corresponding to the second cylinder is larger than the number of the decompression bodies disposed corresponding to the first cylinder.

4. The internal combustion engine according to claim 3, wherein
- the plurality of cams include a pair of cams disposed corresponding to the second cylinder, and
- the plurality of decompression bodies include a pair of decompression bodies disposed corresponding to the pair of cams.

5. The internal combustion engine according to claim 4, wherein
- the pair of decompression bodies are each disposed at a different position on outer peripheral surfaces of the pair of cams to be retractable inward of the pair of cams from the outer peripheral surfaces of the pair of cams.

6. The internal combustion engine according to claim 1, wherein
- the plurality of decompression bodies have a same structure.

7. The internal combustion engine according to claim 1, further comprising:

a single camshaft to which all the decompression bodies and all the plurality of cams corresponding to all the decompression bodies are attached.

8. An internal combustion engine comprising:

a crankshaft;

a first cylinder and a second cylinder;

a decompression device configured to depressurize the first cylinder and the second cylinder at a time when the internal combustion engine starts to rotationally derive relative to the first cylinder and the second cylinder at a time after the internal combustion engine starts to rotationally drive, wherein the decompression device is configured such that, at the time when the internal combustion engine starts to rotationally derive, a decompression amount in the second cylinder is greater than a decompression amount in the first cylinder; and a control device configured to control a combustion state in the second cylinder such that the combustion state is different between at the time when the internal combustion engine starts to rotationally drive and at the time after the internal combustion engine starts to rotationally drive.

9. An internal combustion engine comprising:

a crankshaft;

a cylinder;

a plurality of valves configured to open and shut off a combustion chamber of the cylinder to an outside of the combustion chamber;

a decompression device configured to depressurize the cylinder at a time when the internal combustion engine starts to rotationally drive relative to the cylinder at a time after the internal combustion engine starts to rotationally drive; and a pair of cams configured to rotate about a predetermined axis to apply a drive force to the plurality of valves, wherein the decompression device includes a plurality of decompression bodies disposed corresponding to the cylinder, and configured to be shifted between a reference position inward of the pair of cams and a protruding position protruding outward from outer peripheral surfaces of the pair of cams, the plurality of decompression bodies are each disposed at a different position on the outer peripheral surfaces of the pair of cams to be retractable inward of the pair of cams from the outer peripheral surfaces of the pair of cams, the decompression device further includes:

a cylindrical camshaft to which the pair of cams are attached; and a decompression shaft inserted into the camshaft, rotatably supported about an axis of the camshaft independently of the camshaft, and configured to apply a predetermined external force to the plurality of decompression bodies, and the camshaft has a shaft support portion that is positioned between the pair of cams, the shaft support portion rotatably supporting the decompression shaft.

10. A method for decompressing a first cylinder and a second cylinder of an internal combustion engine by a decompression device, the method comprising:

depressurizing both of the first cylinder and the second cylinder at a time when the internal combustion engine starts to rotationally derive relative to both of the first cylinder and the second cylinder at a time after the internal combustion engine starts to rotationally drive;

pressurizing both of the first cylinder and the second cylinder at the time after the internal combustion engine starts to rotationally drive relative to both of the first cylinder and the second cylinder at the time when the internal combustion engine starts to rotationally derive; and at the time when the internal combustion engine starts to rotationally derive, increasing a decompression amount in the second cylinder relative to a decompression amount in the first cylinder.

11. The method according to claim 10, wherein increasing the decompression amount in the second cylinder includes, in a compression stroke of the internal combustion engine, causing a lift amount of a valve disposed corresponding to the second cylinder to be larger than a lift amount of a valve disposed corresponding to the first cylinder.

12. The method according to claim 10, wherein increasing the decompression amount in the second cylinder includes, in a compression stroke of the internal combustion engine, causing an opening period of the second cylinder by a valve disposed corresponding to the second cylinder to be longer than an opening period of the first cylinder by a valve disposed corresponding to the first cylinder.

* * * * *